(12) United States Patent
Yoon et al.

(10) Patent No.: US 11,706,803 B2
(45) Date of Patent: Jul. 18, 2023

(54) METHOD FOR TRANSMITTING AND RECEIVING REFERENCE SIGNAL FOR RADIO LINK MONITORING IN UNLICENSED BAND AND DEVICE THEREFOR

(71) Applicant: LG Electronics Inc., Seoul (KR)

(72) Inventors: Sukhyon Yoon, Seoul (KR); Seonwook Kim, Seoul (KR); Joonkui Ahn, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 104 days.

(21) Appl. No.: 17/261,428

(22) PCT Filed: Aug. 5, 2019

(86) PCT No.: PCT/KR2019/009736
§ 371 (c)(1),
(2) Date: Jan. 19, 2021

(87) PCT Pub. No.: WO2020/032507
PCT Pub. Date: Feb. 13, 2020

(65) Prior Publication Data
US 2021/0315012 A1 Oct. 7, 2021

(30) Foreign Application Priority Data
Aug. 7, 2018 (KR) .................. 10-2018-0091977

(51) Int. Cl.
*H04W 74/08* (2009.01)
*H04W 74/00* (2009.01)
(Continued)

(52) U.S. Cl.
CPC ...... *H04W 74/0816* (2013.01); *H04B 7/0626* (2013.01); *H04L 5/0051* (2013.01); *H04W 24/08* (2013.01); *H04W 74/008* (2013.01)

(58) Field of Classification Search
CPC ..... H04B 7/0626; H04L 5/0051; H04L 5/005; H04L 5/0098; H04W 24/08; H04W 74/008; H04W 74/0816; H04W 24/10
See application file for complete search history.

(56) References Cited

U.S. PATENT DOCUMENTS

2016/0165607 A1* 6/2016 Hedayat ................ H04W 24/00
370/338
2019/0141734 A1* 5/2019 Lei ..................... H04W 72/0453
2021/0243808 A1* 8/2021 Deenoo ............. H04W 74/0841

FOREIGN PATENT DOCUMENTS

KR    1020160094877    8/2016

OTHER PUBLICATIONS

InterDigital Inc., "RLM/RLF for NR-Unlicensed," R2-1809612, 3GPP TSG-RAN WG2 NR AH1807 Meeting, Montreal, Canada, dated Jul. 2-6, 2018, 5 pages.
(Continued)

*Primary Examiner* — Derrick V Rose
(74) *Attorney, Agent, or Firm* — Fish & Richardson P.C.

(57) ABSTRACT

The present invention discloses a method for a base station to transmit a radio link monitoring-reference signal (RLM-RS) in an unlicensed band. In particular, the method may divide a frequency band for the RLM-RS into a plurality of sub-bands, perform a channel clearance assessment (CCA) for each of the plurality of sub-bands, and transmit the RLM-RS via each of the plurality of sub-bands on the basis of the result of performing the CCA.

9 Claims, 17 Drawing Sheets

(51) Int. Cl.
*H04W 24/08* (2009.01)
*H04B 7/06* (2006.01)
*H04L 5/00* (2006.01)

(56) References Cited

OTHER PUBLICATIONS

Nokia, Nokia Shanghai Bell, "RLM/RLF measurement on NR-U," R2-1810214, R2-1807126, 3GPP TSG-RAN WG2 Meeting #AH-1807, Montreal, Canada, dated Jul. 2-6, 2018, 6 pages.
PCT International Search Report and Written Opinion in International Appln. No. PCT/KR2019/009736, dated Dec. 4, 2019, 18 pages (with English translation).
Vivo, "Evaluation of the RLM for NR-U," R2-1809882, 3GPP TSG-RAN WG2 NR AH1807 Meeting, Montreal, Canada, dated Jul. 2-6, 2018, 9 pages.
ZTE, "Considerations on mobility for NR-U," R2-1809838, 3GPP TSG-RAN WG2 NR AH1807 Meeting, Montreal, Canada, dated Jul. 2-6, 2018, 5 pages.

\* cited by examiner (A) CONTROL-PLANE PROTOCOL STACK (B) USER-PLANE PROTOCOL STACK

METHOD FOR TRANSMITTING AND RECEIVING REFERENCE SIGNAL FOR RADIO LINK MONITORING IN UNLICENSED BAND AND DEVICE THEREFOR

CROSS-REFERENCE TO RELATED APPLICATIONS

This application is a National Stage application under 35 U.S.C. § 371 of International Application No. PCT/KR2019/009736, filed on Aug. 5, 2019, which claims the benefit of Korean Application No. 10-2018-0091977, filed on Aug. 7, 2018. The disclosures of the prior applications are incorporated by reference in their entirety.

TECHNICAL FIELD

The present disclosure relates to a method and apparatus for transmitting and receiving a radio link monitoring-reference signal (RLM-RS) in an unlicensed band, and more particularly, to a method and apparatus for dividing the bandwidth of an RLM-RS into a plurality of sub-bands and transmitting the RLM-RS in each of the sub-bands.

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An aspect of the present disclosure is to provide a method and apparatus for transmitting and receiving a radio link monitoring-reference signal (RLM-RS) in an unlicensed band.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting a radio link monitoring-reference signal (RLM-RS) in an unlicensed band by a base station (BS) includes dividing a frequency band for the RLM-RS into a plurality of sub-bands, performing clear channel assessment (CCA) for each of the plurality of sub-bands, and transmitting the RLM-RS in each of the plurality of sub-bands based on a result of the CCA.

The RLM-RS may be transmitted in a sub-band determined to be in an idle state, without being transmitted in a sub-band determined to be occupied, among the plurality of sub-bands.

Further, in the absence of any sub-band determined to be in the idle state, the RLM-RS may be transmitted at a second candidate time position following a first candidate time position for RLM-RS transmission, for which the CCA has been performed.

Further, the RLM-RS may be transmitted at a first candidate time position for RLM-RS transmission, for which the CCA has been performed, in a sub-band determined to be in an idle state, and at a second candidate time position following the first candidate time in a sub-band determined to be occupied, among the plurality of sub-bands.

Further, when a reference sub-band is determined to be occupied among the plurality of sub-bands, the RLM-RS may be transmitted at a second candidate time position following a first candidate time position for RLM-RS transmission, for which the CCA has been performed, and when a sub-band other than the reference sub-band is determined to be occupied, the RLM-RS is not transmitted.

Further, an RLM-RS resource set into which a plurality of RLM-RS resources corresponding to one beam are grouped may be allocated to each of the plurality of sub-bands.

In another aspect of the present disclosure, a BS for transmitting an RLM-RS in an unlicensed band includes at least one transceiver, at least one processor, and at least one memory operatively coupled to the at least one processor and storing instructions which when executed, cause the at least one processor to perform specific operations. The specific operations include dividing a frequency band for the RLM-RS into a plurality of sub-bands, performing CCA for each of the plurality of sub-bands, and transmitting the RLM-RS in each of the plurality of sub-bands based on a result of the CCA.

The RLM-RS may be transmitted in a sub-band determined to be in an idle state, without being transmitted in a sub-band determined to be occupied, among the plurality of sub-bands.

Further, in the absence of any sub-band determined to be in the idle state, the RLM-RS may be transmitted at a second candidate time position following a first candidate time position for RLM-RS transmission, for which the CCA has been performed.

Further, the RLM-RS may be transmitted at a first candidate time position for RLM-RS transmission, for which the CCA has been performed, in a sub-band determined to be in an idle state, and at a second candidate time position following the first candidate time in a sub-band determined to be occupied, among the plurality of sub-bands.

Further, when a reference sub-band is determined to be occupied among the plurality of sub-bands, the RLM-RS may be transmitted at a second candidate time position following a first candidate time position for RLM-RS transmission, for which the CCA has been performed, and when a sub-band other than the reference sub-band is determined to be occupied, the RLM-RS is not transmitted.

Further, an RLM-RS resource set into which a plurality of RLM-RS resources corresponding to one beam are grouped may be allocated to each of the plurality of sub-bands.

In another aspect of the present disclosure, an apparatus for receiving an RLM-RS in an unlicensed band includes at least one processor, and at least one memory operatively coupled to the at least one processor and storing instructions which when executed, cause the at least one processor to perform specific operations. The specific operations include receiving the RLM-RS in each of a plurality of sub-bands included in a frequency band for the RLM-RS, and measuring channel quality of the frequency band for the RLM-RS based on each of the plurality of sub-bands in which the RLM-RS has been received.

The apparatus may be communicable with at least one of a user equipment (UE), a network, a BS, or an autonomous driving vehicle other than the apparatus.

Advantageous Effects

According to the present disclosure, even when a radio link monitoring-reference signal (RLM-RS) to which a wideband is allocated is transmitted, clear channel assessment (CCA) is performed on a sub-band basis. Accordingly, the RLM-RS may be transmitted efficiently.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
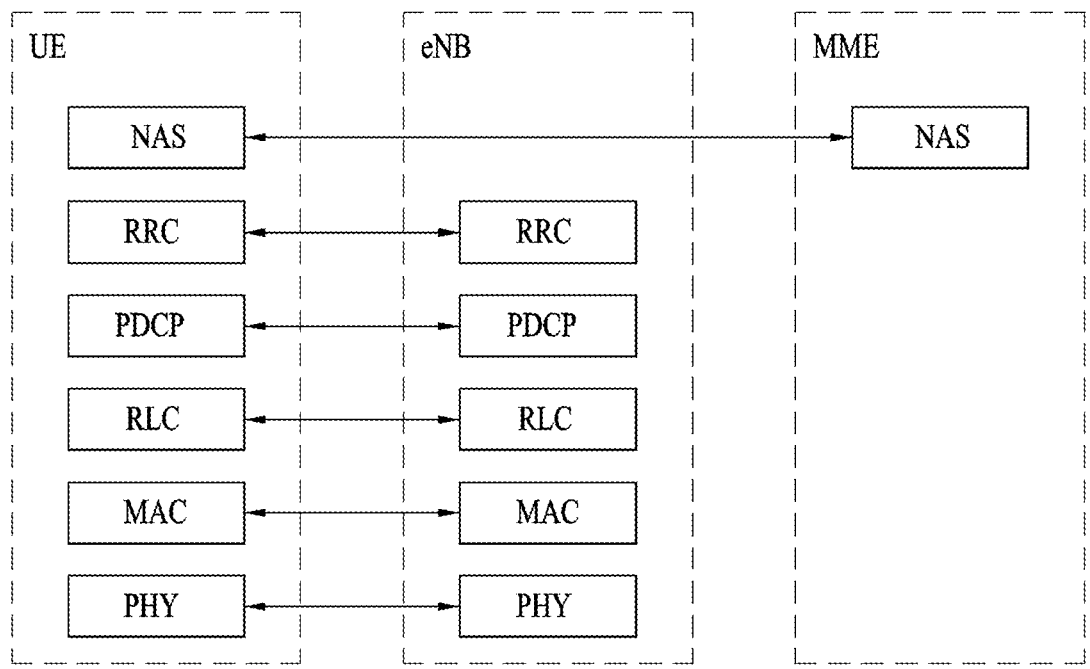
FIG. 1 is a diagram illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.
Figure 1:
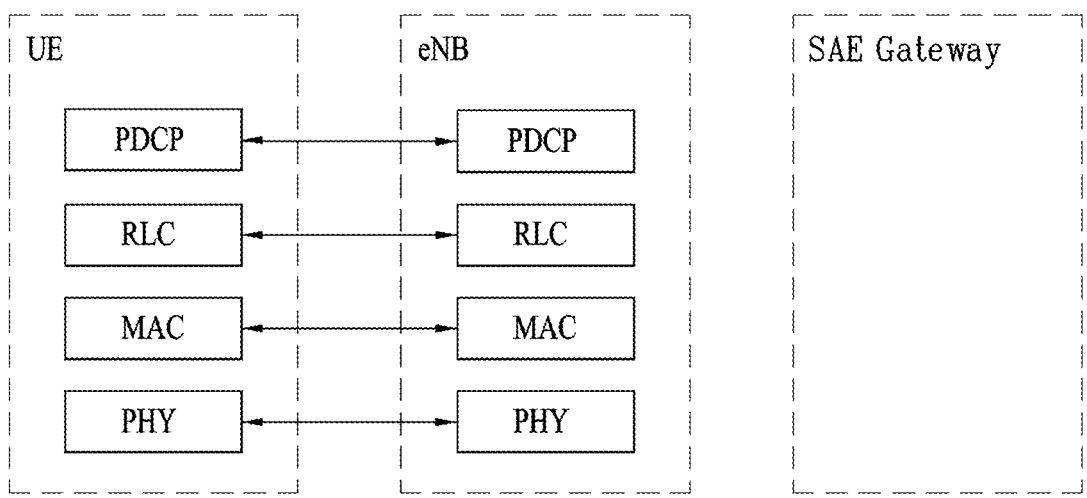

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying an SS (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

<Artificial Intelligence (AI)>

AI refers to the field of studying AI or methodology for making the same, and machine learning refers to the field of defining various issues dealt with in the AI field and studying methodology for solving the various issues. The machine learning is defined as an algorithm that enhances the performance of a certain task through consistent experiences with the task.

An artificial neural network (ANN) is a model used in the machine learning and may mean a whole model of problem-solving ability which is composed of artificial neurons (nodes) that form a network by synaptic connections. The ANN may be defined by a connection pattern between neurons in different layers, a learning process for updating model parameters, and an activation function for generating an output value.

The ANN may include an input layer, an output layer, and optionally one or more hidden layers. Each layer includes one or more neurons, and the ANN may include a synapse that links neurons. In the ANN, each neuron may output the function value of the activation function for input signals, weights, and bias input through the synapse.

The model parameter refers to a parameter determined through learning and includes the weight value of a synaptic connection and the bias of a neuron. A hyperparameter means a parameter to be set in the machine learning algorithm before learning and includes a learning rate, a repetition number, a mini-batch size, and an initialization function.

The purpose of the learning of the ANN may be to determine the model parameter that minimizes a loss function. The loss function may be used as an index to determine the optimal model parameter in the learning process of the ANN.

Machine learning may be classified into supervised learning, unsupervised learning, and reinforcement learning according to learning mechanisms.

The supervised learning may refer to a method of training the ANN in a state that labels for learning data are given, and the label may mean a correct answer (or result value) that the ANN must infer when the learning data is input to the ANN. The unsupervised learning may refer to a method of training the ANN in a state that labels for learning data are not given. The reinforcement learning may refer to a method of learning an agent defined in a certain environment to select a behavior or a behavior sequence that maximizes cumulative compensation in each state.

Machine learning implemented with a deep neural network (DNN) including a plurality of hidden layers among ANNs is referred to as deep learning. The deep running is part of the machine running. The machine learning used herein includes the deep running.

<Robot>

A robot may refer to a machine that automatically processes or operates a given task based on its own ability. In particular, a robot having a function of recognizing an environment and making a self-determination may be referred to as an intelligent robot.

Robots may be classified into industrial robots, medical robots, home robots, military robots, etc. according to use purposes or fields.

The robot may include a driving unit having an actuator or a motor and perform various physical operations such as moving a robot joint. In addition, a movable robot may include a driving unit having a wheel, a brake, a propeller, etc. and may travel on the ground or fly in the air through the driving unit.

<Autonomous Driving (Self-Driving)>

Autonomous driving refers to a technique of driving by itself. An autonomous driving vehicle refers to a vehicle moving with no user manipulation or with minimum user manipulation.

For example, the autonomous driving may include a technology for maintaining a current lane, a technology for automatically adjusting a speed such as adaptive cruise control, a technique for automatically moving along a predetermined route, and a technology for automatically setting a route and traveling along the route when a destination is determined.

The vehicle may include a vehicle having only an internal combustion engine, a hybrid vehicle having an internal combustion engine and an electric motor together, and an electric vehicle having only an electric motor. Further, the vehicle may include not only an automobile but also a train, a motorcycle, etc.

The autonomous driving vehicle may be regarded as a robot having the autonomous driving function.

<Extended Reality (XR)>

Extended reality (XR) is collectively referred to as virtual reality (VR), augmented reality (AR), and mixed reality (MR). The VR technology provides real-world objects and backgrounds as CG images, the AR technology provides virtual CG images on real object images, and the MR technology is a computer graphic technology of mixing and combining virtual objects with the real world.

The MR technology is similar to the AR technology in that real and virtual objects are shown together. However, the MR technology is different from the AR technology in that the AR technology uses virtual objects to complement real objects, whereas the MR technology deal with virtual and real objects in the same way.

The XR technology may be applied to a HMD, a head-up display (HUD), a mobile phone, a tablet PC, a laptop computer, a desktop computer, a TV, a digital signage, etc. A device to which the XR technology is applied may be referred to as an XR device.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations.

Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
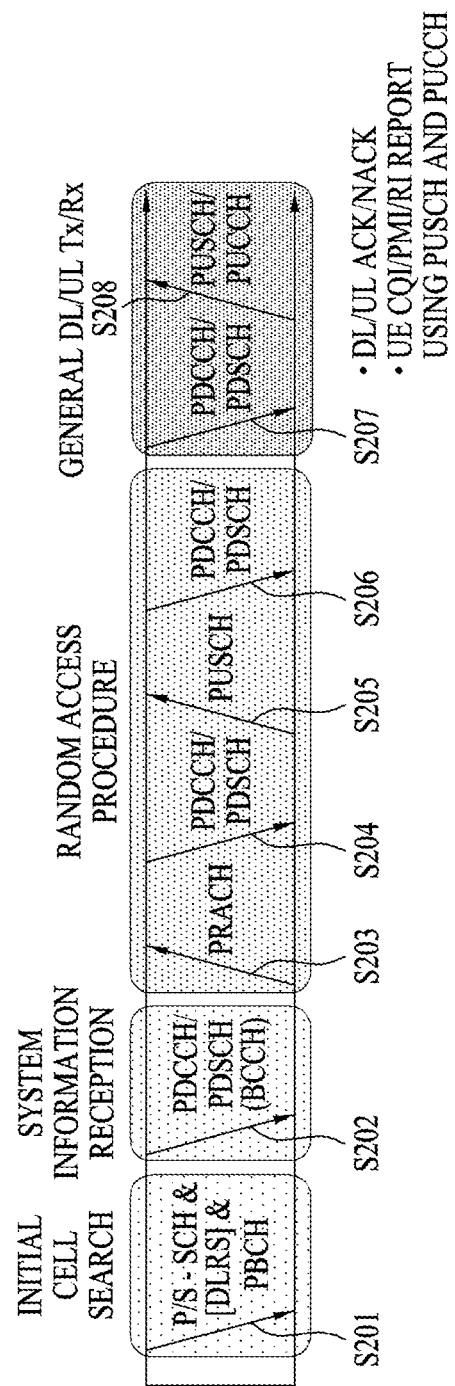
FIG. 2 is a diagram illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DL RS.

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

Figure 3:
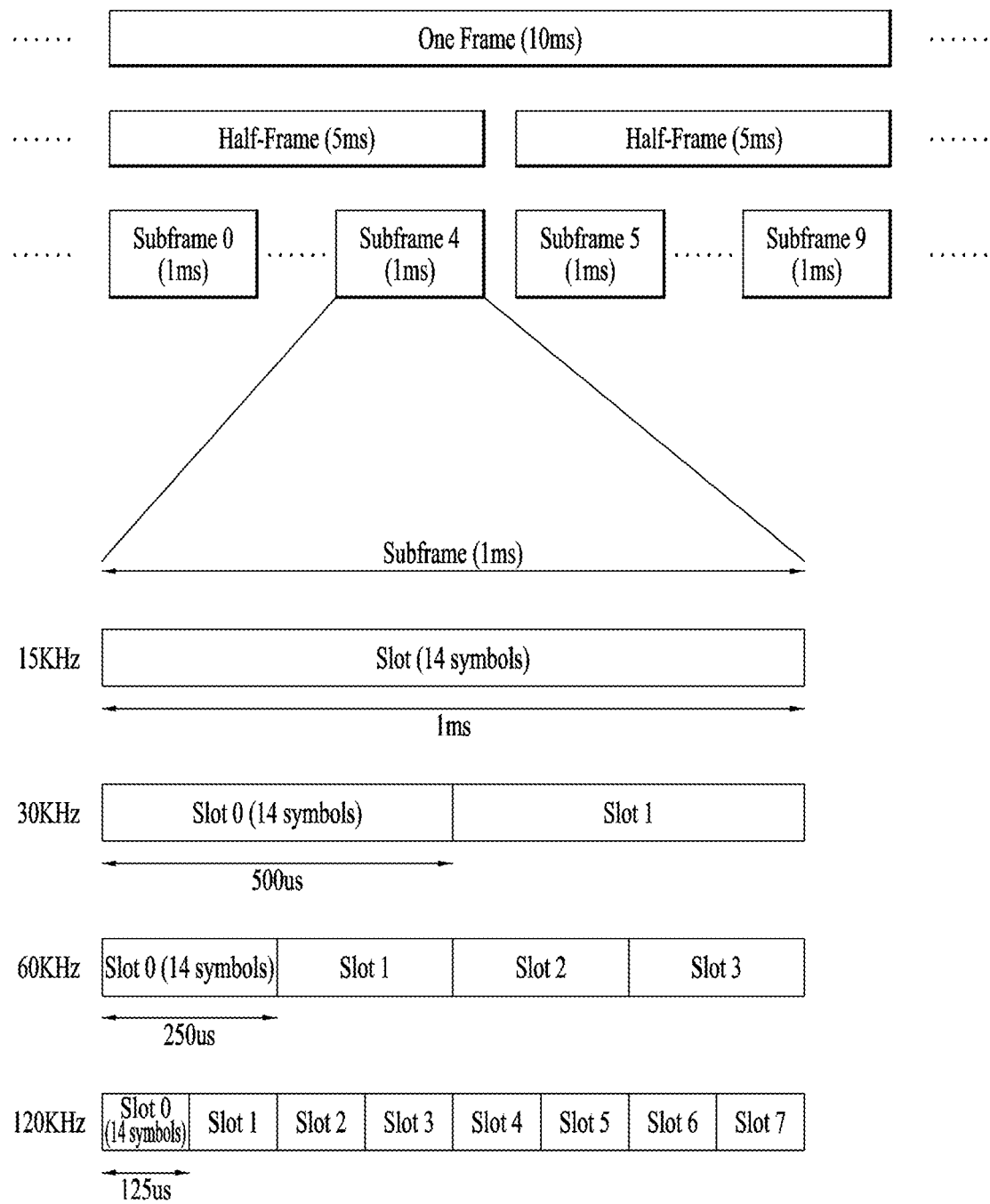
FIGS. 3, 4 and 5 are diagrams illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe

[Table 2] illustrates that the number of symbols per slot, the number of slots per frame, and the number of slots per subframe vary according to the SCS when the extended CP is used.

TABLE 2

| SCS(15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

Figure 4:
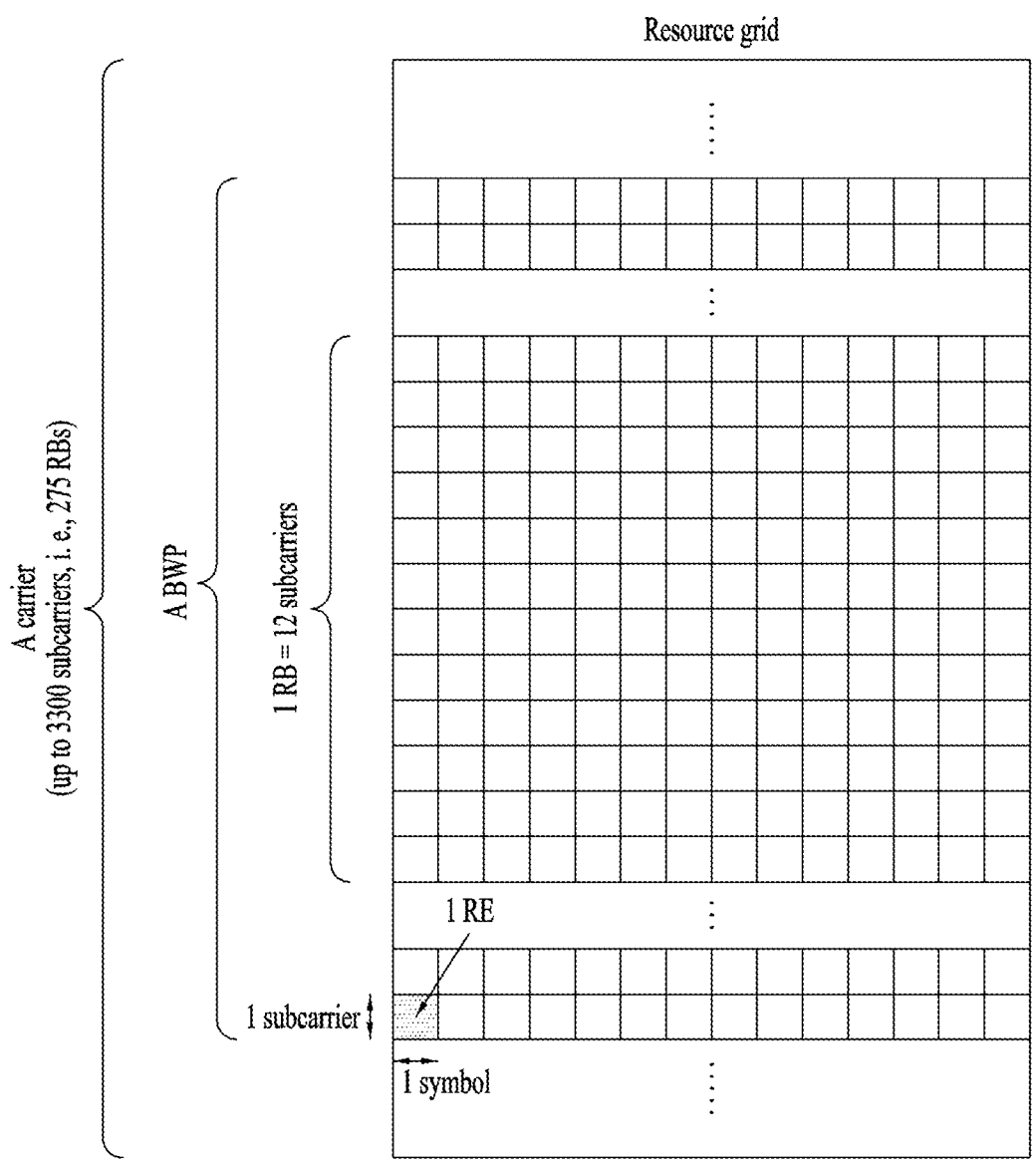

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells. FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 5:
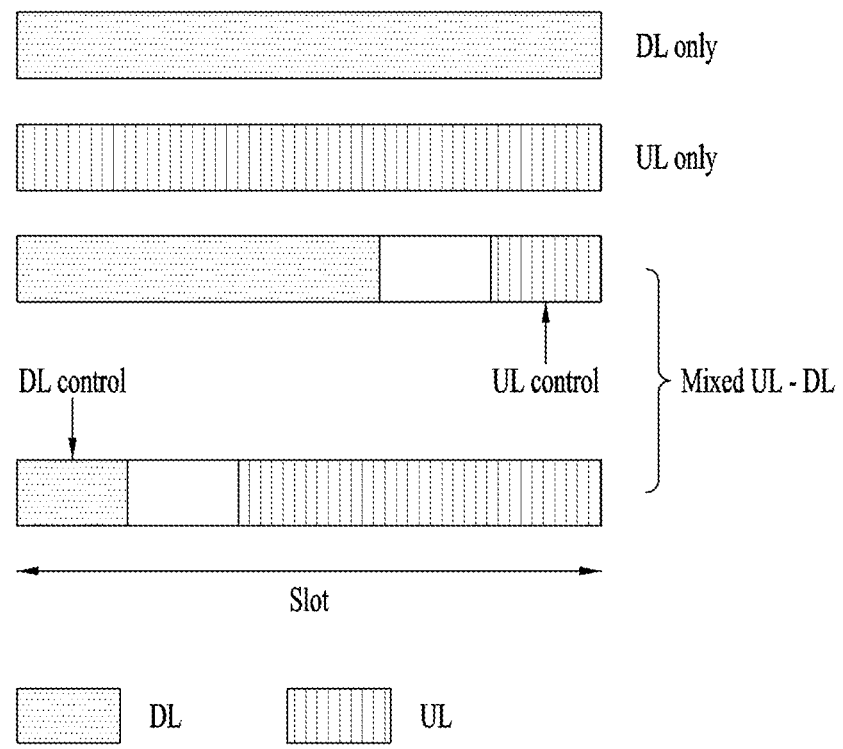

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Figure 6:
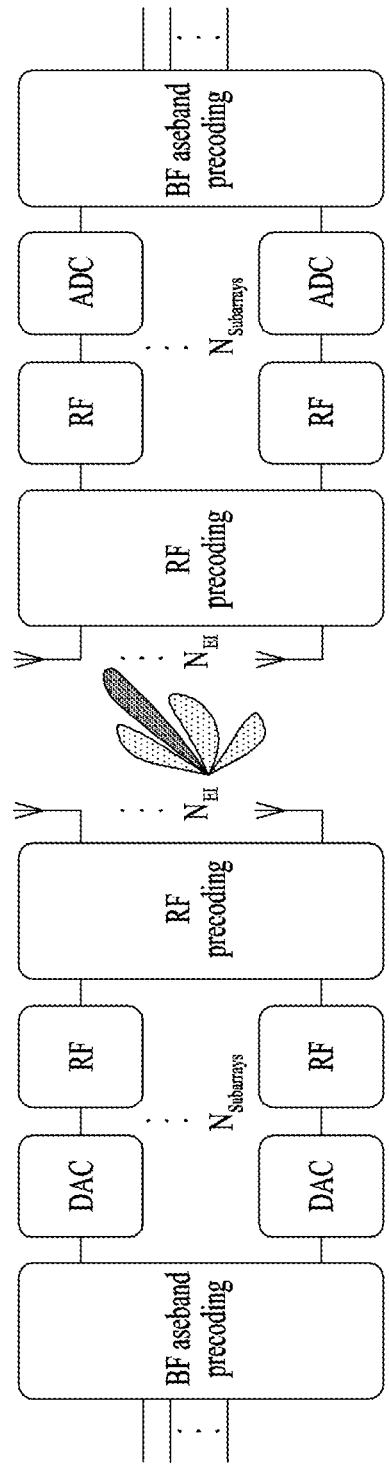
FIG. 6 is a diagram illustrating analog beamforming in the NR system.

FIG. 6 is a block diagram illustrating an exemplary transmitter and receiver for hybrid BF.

To form a narrow beam in the millimeter frequency band, a BF method is mainly considered, in which a BS or a UE transmits the same signal through multiple antennas by applying appropriate phase differences to the antennas and thus increasing energy only in a specific direction. Such BF methods include digital BF for generating a phase difference for digital baseband signals, analog BF for generating phase differences by using time delays (i.e., cyclic shifts) for modulated analog signals, and hybrid BF with digital BF and analog beamforming in combination. Use of a radio frequency (RF) unit (or transceiver unit (TXRU)) for antenna element to control transmission power and phase control on antenna element basis enables independent BF for each frequency resource. However, installing TXRUs in all of about 100 antenna elements is less feasible in terms of cost. That is, a large number of antennas are required to compensate for rapid propagation attenuation in the millimeter frequency, and digital BF needs as many RF components (e.g., digital-to-analog converters (DACs), mixers, power amplifiers, and linear amplifiers) as the number of antennas. As a consequence, implementation of digital BF in the millimeter frequency band increases the prices of communication devices. Therefore, analog BF or hybrid BF is considered, when a large number of antennas are needed as is the case with the millimeter frequency band. In analog BF, a plurality of antenna elements are mapped to a single TXRU and a beam direction is controlled by an analog phase shifter. Because only one beam direction is generated across a total band in analog BF, frequency-selective BF may not be achieved with analog BF. Hybrid BF is an intermediate form of digital BF and analog BF, using B RF units fewer than Q antenna elements. In hybrid BF, the number of beam directions available for simultaneous transmission is limited to B or less, which depends on how B RF units and Q antenna elements are connected.

Figure 7:
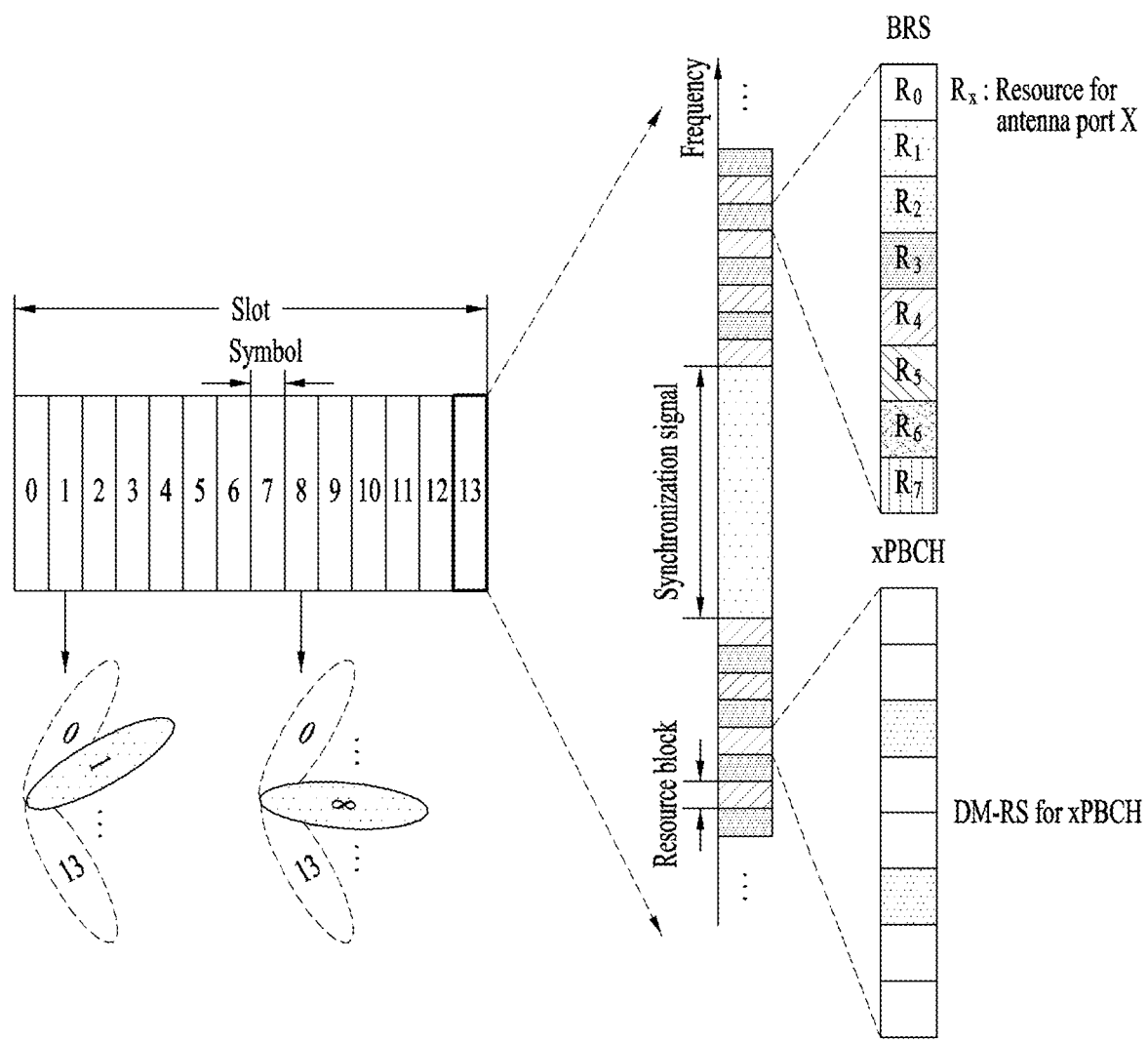
FIG. 7 is a diagram illustrating beam sweeping for a synchronization signal and system information in a downlink (DL) transmission process.
Figure 9:
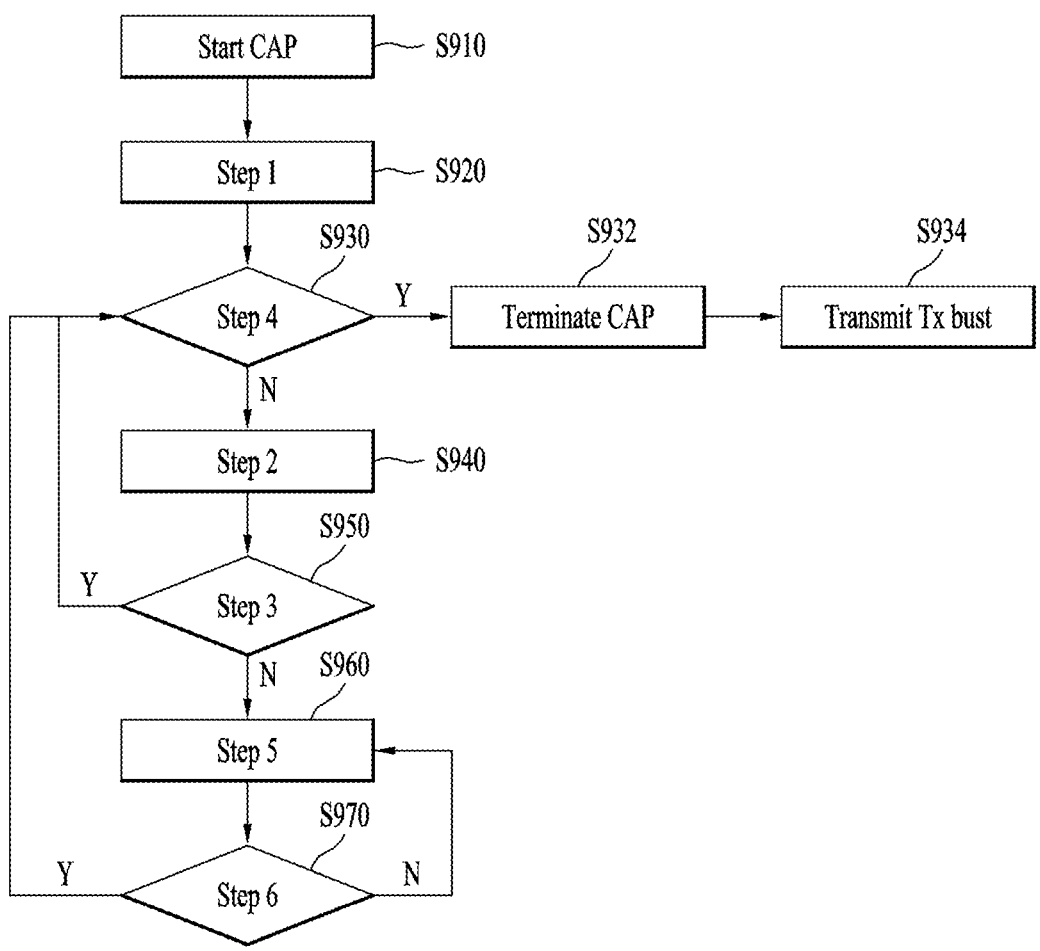

FIG. 7 is a diagram illustrating beam sweeping for an SS and system information in a DL transmission process. In FIG. 7, physical resources or a physical channel through which system information of a New RAT system is broadcast is referred to as xPBCH. Analog beams belonging to different antenna panels may be transmitted simultaneously in one symbol. As illustrated in FIG. 9, to measure the channel of each analog beam, introduction of an RS transmitted for a single analog beam corresponding to a specific antenna panel, known as a beam RS (BRS) is under discussion. The BRS may be defined for a plurality of antenna ports, and each of the antenna ports of the BRS may correspond to a single analog beam. Unlike the BRS, an SS or xPBCH may be transmitted for all analog beams of an analog beam group so that any UE may successfully receive the SS or xPBCH.

Transmission-Reception (Tx-Rx) Beam Association

To enable a UE to measure beams used in a corresponding cell or beams available to an eNB, the network may configure a known signal such as a measurement reference signal (MRS), a BRS, or a beamformed CSI-RS, to which each beam is applied. The known signals will be generically referred to as the BRS, for the convenience of description.

The eNB may transmit the BRS periodically or aperiodically, and the UE may select an eNB Tx beam suitable for the UE by measuring the BRS. When Rx beams of the UE are also considered, the UE may select a beam combination of an eNB Tx beam and a UE Rx beam by measuring different Rx beams. After this process, a Tx-Rx beam association between the eNB and the UE may be determined explicitly or implicitly.

1) Network Decision Based on Beam Association

The network may indicate to the UE to report top X Tx-Rx beam combinations determined based on measurements. The number of reported beam combinations may be predefined or indicated by higher-layer signaling from the network. Alternatively, all of beam combinations of which the measurements exceed a specific threshold may be reported.

The specific threshold may be predefined or signaled by the network. When each UE has different decoding performance, categories may be defined in consideration of the decoding performances of UEs and a threshold may be defined for each category.

Further, beam combinations may be reported periodically or aperiodically, upon request of the network. Otherwise, when a previous reported result is different from a current measurement result by a specific level or higher, event-triggered reporting may be performed. The specific level may be predefined or signaled by the network.

The UE may report one or more beam associations determined in the above-described manner. When a plurality of beam indexes are reported, priority levels may be assigned to beams. For example, the beam indexes may be reported such that the report is interpreted as a $1^{st}$ preferred beam, a $2^{nd}$ preferred beam, and so on.

2) UE Decision Based on Beam Association

In beam association-based UE decision, UE-preferred beams may be reported in the same manner as the above-proposed explicit beam association.

Quasi-Co Location (QCL)

The UE may receive a list of up to M TCI-State configurations to decode a PDSCH according to a detected PDCCH carrying DCI intended for a given cell. M depends on a UE capability.

As described in Table 4, each TCI-State includes a parameter for establishing the QCL relationship between one or more DL RSs and a PDSCH DM-RS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info and may have one of the following values.
- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

For example, if a target antenna port is for a specific NZP CSI-RS, the NZP CSI-RS antenna port may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS.

Radio Resource Management (RRM) Measurement LTE

The LTE system supports RRM operations including power control, scheduling, cell search, cell reselection, handover, radio link or connection monitoring, and connection establishment/re-establishment. A serving cell may request RRM measurement information which is measurement values required for an RRM operation to the UE. Particularly, the UE may measure and report information about each cell, such as cell search information, reference signal received power (RSRP), and reference signal received quality (RSRQ) in the LTE system. Specifically, the UE receives 'measConfig' in a higher-layer signal for RRM measurement from the serving cell in the LTE system. Then the UE measures RSRP or RSRQ according to information included in 'measConfig'. TS 36.214 for the LTE system defines RSRP, RSRQ, and received signal strength indicator (RSSI) as follows.

RSRP: RSRP is defined as a linear average over the power contributions (in [W]) of REs that carry a cell-specific reference signal (CRS) within a measurement frequency bandwidth. For RSRP determination, CRS R0 according TS 36.211 is used. To increase reliability, CRS R1 may be used in addition to CRS R0 under circumstances. A reference point for the RSRP should be an antenna connector of a UE. When receive diversity is used, the reported RSRP value should not be lower than the RSRP of any of individual diversity branches.

RSRQ: RSRQ is defined as (N*RSRP)/(RSSI of E-UTRA carrier) where N is the number of RBs in the RSSI measurement bandwidth of the E-UTRA carrier. 'N*RSRP' and 'RSSI of E-UTRA carrier' are measured in the same RB set.

E-UTRA carrier RSSI is obtained as the linear average of the total received power observed only in OFDM symbols including reference symbols for antenna port 0 over N RBs from all sources, including co-channel serving and non-serving cells, adjacent channel interference, thermal noise, and so on.

If higher-layer signaling indicates a specific subframe for RSRP measurement, RSSI is measured over all indicated OFDM symbols. In this case, a reference point for the RSRQ should also be an antenna connector of a UE. When receive diversity is used, the RSRQ value should not be lower than the RSRQ of any of individual diversity branches.

RSSI: RSSI is the received wideband power, including thermal noise and noise generated within a bandwidth defined by a receiver pulse shaping filter. A reference point for the RSSI should be an antenna connector of a UE. When receive diversity is used, the reported RSSI value should not be lower than the RSSI of any of individual diversity branches.

According to the above definitions, a UE operating in the LTE system is allowed to measure RSRP in a bandwidth corresponding to one of 6, 15, 25, 50, 75, and 100 RBs by an allowed measurement bandwidth-related information element (IE) in system information block type 3 (SIB3) in the case of intra-frequency measurement. In the case of inter-frequency measurement, the UE is allowed to measure RSRP in a bandwidth corresponding to one of 6, 15, 25, 50, 75, and 100 RBs by an allowed measurement bandwidth-related IE in system information block type 5 (SIB5). Without the IE, the UE may measure RSRP in a total DL system frequency band by default. When the UE receives an allowed measurement bandwidth, the UE may measure RSRP freely within the corresponding value, considering the corresponding value to be a maximum measurement bandwidth.

However, when the serving cell transmits an IE defined as WB-RSRQ and sets an allowed measurement bandwidth to 50 or more RBs, the UE should calculate an RSRP value for a total allowed measurement bandwidth. In regards to RSSI, the UE measures RSSI in a frequency band that the receiver of the UE has according to the definition of an RSSI bandwidth.

The NR communication system is required to support much better performance than the legacy 4$^{th}$ generation (4G) system in terms of data rate, capacity, latency, energy consumption, and cost. Accordingly, the NR system needs to achieve great improvement in bandwidth, spectral energy, signaling efficiency, and cost per bit.

Figure 8:
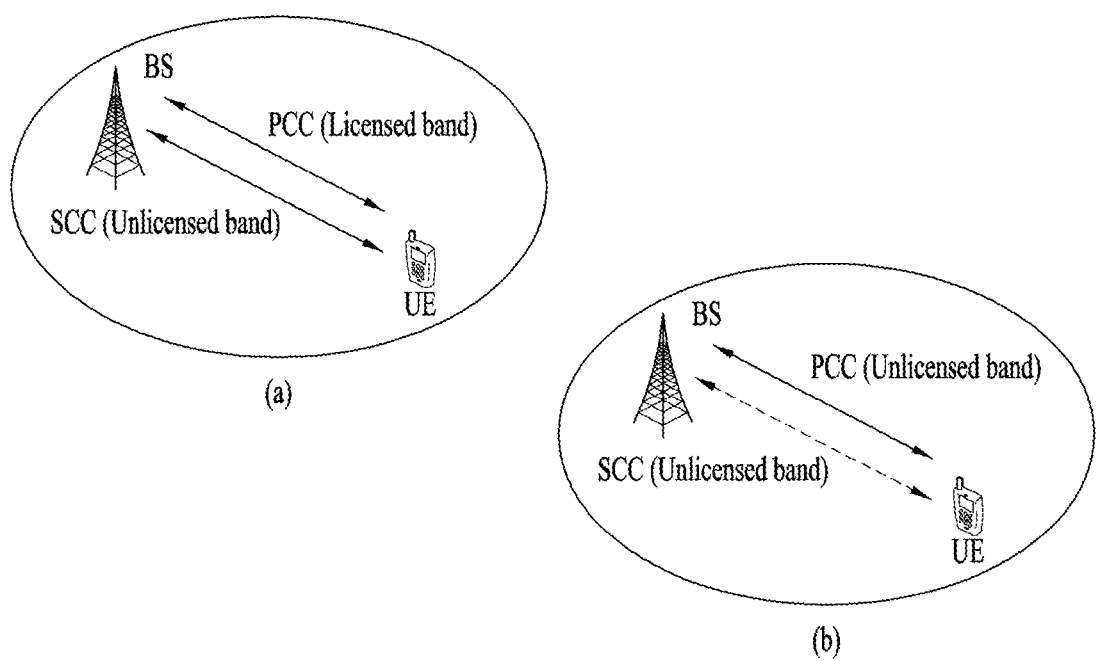
FIGS. 8 and 9 are diagrams illustrating DL channel transmission in an unlicensed band.

FIG. 8 illustrates an exemplary wireless communication system supporting an unlicensed band, which is applicable to the present disclosure.

In the following description, a cell operating in a licensed band (hereinafter, referred to as an L-band) is defined as an L-cell, and the carrier of an L-cell is defined as a (DL/UL) LCC. Further, a cell operating in an unlicensed band (hereinafter, referred to as a U-band) is defined as a U-cell and the carrier of a U-cell is defined as a (DL/UL) UCC. The carrier/carrier-frequency of a cell may refer to the operating frequency (e.g., center frequency) of the cell. A cell/carrier (e.g., component carrier (CC)) is genetically referred to as a cell.

When a UE and a BS transmit and receive signals in a carrier-aggregated LCC and UCC as illustrated in FIG. 8(a), the LCC may be configured as a primary CC (PCC) and the UCC may be configured as a secondary CC (SCC). As illustrated in FIG. 8(b), the UE and the BS may transmit and receive signals in one UCC or a plurality of carrier-aggregated UCCs. That is, the UE and the BS may transmit and receive signals only in UCC(s) without an LCC.

(Unless otherwise specified), a signal transmission/reception operation in an unlicensed band described in the present disclosure may be performed based on all the above-described deployment scenarios.

The NR frame structure of FIG. 3 may be used for an operation in an unlicensed band. The configuration of OFDM symbols occupied for UL/DL signal transmission in the frame structure for the unlicensed band may be configured by the BS. The term OFDM symbol may be replaced with SC-FDM(A) symbol.

To transmit a DL signal in an unlicensed band, the BS may indicate the configuration of OFDM symbols used in subframe #n to the UE by signaling. The term subframe may be replaced with slot or time unit (TU).

Specifically, in an LTE system supporting an unlicensed band, the UE may assume (or identify) the configuration of OFDM symbols occupied in subframe #n by a specific field (e.g., a Subframe configuration for LAA field or the like) in DCI received in subframe #n−1 or subframe #n from the BS.

Table 3 describes a method of indicating the configuration of OFDM symbols used for transmission of a DL physical channel and/or physical signal in a current and/or next subframe by the Subframe configuration for LAA field in the LTE system.

TABLE 3

| Value of 'Subframe configuration for LAA' field in current subframe | Configuration of occupied OFDM symbols (current subframe, next subframe) |
| --- | --- |
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
- (—, Y) means UE may assume the first Y symbols are occupied in next subframe and other symbols in the next subframe are not occupied.
- (X, —) means UE may assume the first X symbols are occupied in current subframe and other symbols in the current subframe are not occupied.
- (X, *) means UE may assume the first X symbols are occupied in current subframe, and at least the first OFDM symbol of the next subframe is not occupied.

For UL signal transmission in an unlicensed band, the BS may indicate a UL transmission period to the UE by signaling.

Specifically in the LTE system supporting an unlicensed band, the UE may obtain 'UL duration' and 'UL offset' information for subframe #n from a 'UL duration and offset' field in detected DCI.

Table 4 illustrates a method of indicating the configuration of a UL offset and a UL duration by the UL duration and offset field in the LTE system.

TABLE 4

| Value of 'UL duration and offset' field | UL offset, l (in subframes) | UL duration, d (in subframes) |
| --- | --- | --- |
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |

TABLE 4-continued

| Value of 'UL duration and offset' field | UL offset, l (in subframes) | UL duration, d (in subframes) |
|---|---|---|
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, if the UL duration and offset field configures (or indicates) UL offset 1 and LTL duration d for subframe #n, the LTE does not need to receive a DL physical channel and/or physical signal in subframe #(n+1+i) (where i=0, 1, . . . , d−1).

The BS may perform one of the following unlicensed band access procedures (e.g., channel access procedures (CAPs)) to transmit a DL signal in the unlicensed band.

(1) First DL CAP Method

FIG. 9 is a flowchart illustrating a DL CAP for DL signal transmission in an unlicensed band, performed by a BS.

For DL signal transmission (e.g.; transmission of a DL signal such as a PDSCH/PDCCH/enhanced PDCCH (EPDCCH)), the BS may initiate a CAP (S910). The BS may randomly select a backoff counter N within a contention window (CW) according to step 1. N is set to an initial value $N_{init}$ (S920). $N_{init}$ is a random value selected from the values between 0 and $CW_p$. Subsequently, when the backoff counter value N is 0 according to step 4 (S930; Y), the BS terminates the CAP (S932). The BS may then perform a Tx burst transmission including transmission of a PDSCH/PDCCH/EPDCCH (S934), On the contrary, when the backoff counter value N is not 0 (S930; N), the BS decrements the backoff counter value by 1 according to step 2 (S940). Subsequently, the BS checks whether the channel of U-cell(s) is idle (S950). If the channel is idle (S950; Y), the BS determines whether the backoff counter value is 0 (S930). On the contrary, when the channel is not idle, that is, the channel is busy (S950; N), the BS determines whether the channel is idle during a longer defer duration $T_d$ (25 usec or longer) than a slot duration (e.g., 9 usec) according to step 5 (S960). If the channel is idle during the defer duration (S970; Y), the BS may resume the CAP. The defer duration may include a 16-usec duration and the immediately following $m_p$ consecutive slot durations (e.g., each being 9 usec). On the contrary, if the channel is busy during the defer duration (S970; N), the BS re-checks whether the channel of the U-cell(s) is idle during a new defer duration by performing step S960 again.

Table 5 illustrates that $m_p$, a minimum CW, a maximum CW, a maximum channel occupancy time (MCOT), and an allowed CW size applied to a CAP vary according to channel access priority classes.

TABLE 5

| Channel Access Priority Class (p) | $m_p$ | $CW_{min,p}$ | $CW_{max,p}$ | $T_{ulcot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK, In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available, (2) Second DL CAP Method The BS may perform a DI, signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}$=25 us. $T_{drs}$ includes a duration $T_f$ (=16 us) following one sensing slot duration $T_{sl}$ (=9 us).

(3) Third DL CAP Method

The BS may perform the following CAPS for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining $N_{init}$ for a specific carrier.

Figure 10:
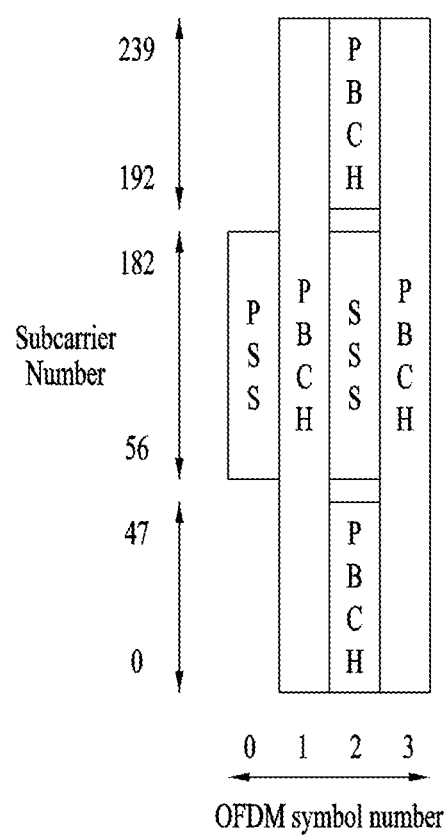
FIGS. 10 and 11 are diagrams illustrating a structure and transmission method of a synchronization signal (SS)/physical broadcast channel (PBCH) block used in the NR system.

FIG. 10 illustrates an SSB structure. The UE may perform cell search, system information acquisition, beam alignment for initial connection, DL measurement, etc. based on the SSB. The SSB is used interchangeably with the synchronization signal/physical broadcast channel (SS/PBCH) block.

Referring to FIG. 10, an SSB is composed of a PSS, a SSS and a PBCH. The SSB is composed of four consecutive OFDM symbols. The PSS, the PBCH, the SSS/PBCH and the PBCH are transmitted on each OFDM symbol, respectively. The PSS and the SSS are each composed of one OFDM symbol and 127 subcarriers, and the PBCH is composed of 3 OFDM symbols and 576 subcarriers. Polar coding and quadrature phase shift keying (QPSK) are applied to the PBCH. The PBCH is composed of a data RE and a demodulation reference signal (DMRS) RE for each OFDM symbol. There are three DMRS REs per RB, and there are three data REs between the DMRS REs.

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as shown in Table 6 below.

TABLE 6

| | Type of Signals | Operations |
|---|---|---|
| 1$^{st}$ step | PSS | * SS/PBCH block (SSB) symbol timing acquisition<br>* Cell ID detection within a cell ID group (3 hypothesis) |
| 2$^{nd}$ Step | SSS | * Cell ID group detection (336 hypothesis) |
| 3$^{rd}$ Step | PBCH DMRS | * SSB index and Half frame (HF) index (Slot and frame boundary detection) |
| 4$^{th}$ Step | PBCH | * Time information (80 ms, System Frame Number (SFN), SSB index, HF)<br>* Remaining Minimum System Information (RMSI) Control resource set (CORESET)/ Search space configuration |
| 5$^{th}$ Step | PDCCH and PDSCH | * Cell access information<br>* RACH configuration |

There may be 336 cell ID groups, and each cell ID group may have three cell IDs. There may be 1008 cell IDs in total. Information about a cell ID group to which a cell ID of a cell belongs may be provided/obtained through the SSS of the cell, and information about the cell ID among 336 cells in the cell ID may be provided/obtained through the PSS.

Figure 11:
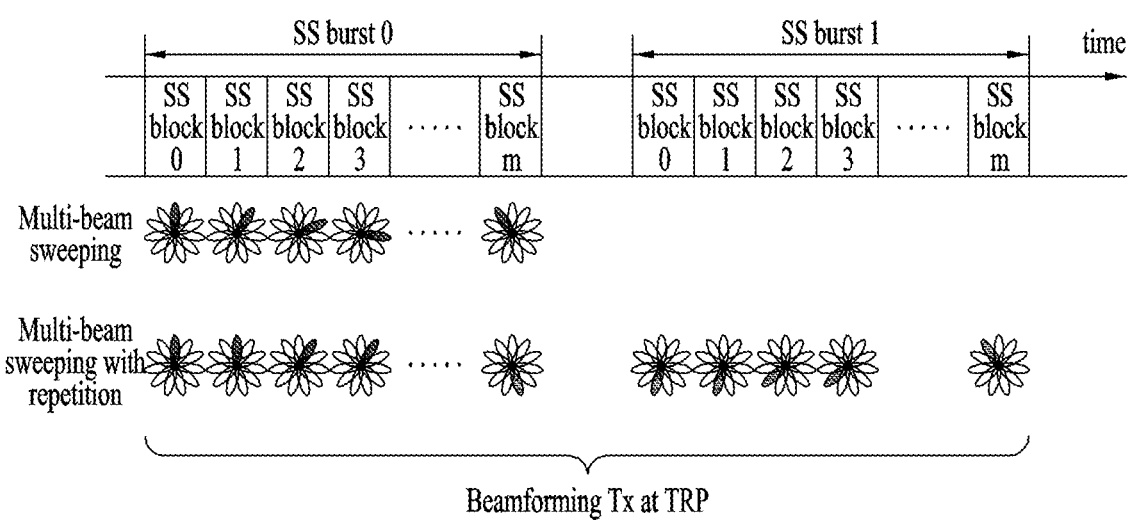

FIG. 11 illustrates exemplary multi-beam transmission of SSBs.

Beam sweeping refers to changing the beam (direction) of a wireless signal over time at a transmission reception point (TRP) (e.g., a BS/cell) (hereinafter, the terms beam and beam direction are interchangeably used). Referring to FIG. 10, an SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, maximum number of beams=4

For frequency range from 3 GHz to 6 GHz, maximum number of beams=8

For frequency range from 6 GHz to 52.6 GHz, maximum number of beams=64

Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit an RACH preamble in PRACH resources linked/corresponding to the index (i.e., beam) of the best SSB. The SSB may also be used for beam alignment between the BS and the UE even after the initial access.

CSI Feedback

The 3GPP LTE(-A) system defines that a UE reports CSI to a BS. CSI generically refers to information representing the quality of a radio channel (or link) established between a UE and an antenna port. For example, the CSI may correspond to a rank indicator (RI), a precoding matrix indicator (PMI), and a channel quality indicator (CQI). The RI represents information about the rank of a channel, meaning the number of streams that the UE receives in the same time-frequency resources. Because the RI is determined depending on long-term fading of the channel, the UE generally feeds back the RI to the BS, with a longer periodicity than those of the PMI and the CQI. The PMI is a UE-preferred precoding index based on a metric such as signal-to-interference and noise ratio (SINR), reflecting a channel spatial property. The CQI represents the strength of the channel, which means a reception SINR that may be achieved when the BS uses the PMI.

In the 3GPP LTE(-A) system, the BS may configure a plurality of CSI processes for the UE and receive a report of CSI for each process. A CSI process includes a CSI-RS for measurement of the quality of a signal from the BS and CSI-interference measurement (CSI-IM) resources for interference measurement.

CM-Related Operations

In the NR system, a CSI-RS is used for time/frequency tracking, CSI computation, reference signal received power (RSRP) calculation, and mobility. CSI computation is related to CSI acquisition, and RSRP computation is related to beam management (BM).

Figure 12:
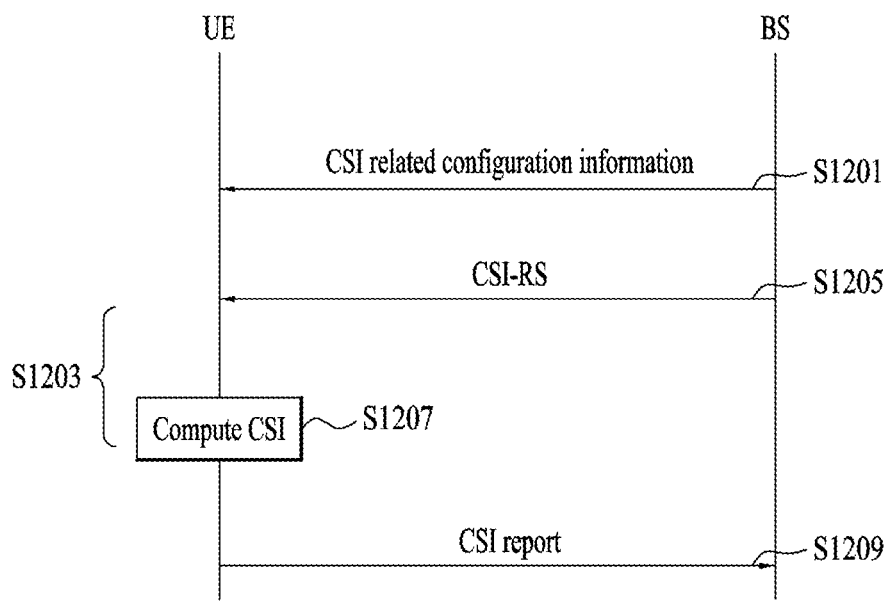
FIG. 12 is a diagram illustrating a signal flow for channel state information (CSI) reporting.

FIG. 12 is a diagram illustrating a signal flow for a CSI-related process.

For one of the above-described uses of the CSI-RS, a UE receives CSI-related configuration information from a BS by RRC signaling (S1201).

The CSI-related configuration information may include at least one of channel state information interference measurement (CSI-IM) resource-related information, CSI measurement configuration-related information, CSI resource configuration-related information, CSI-RS resource-related information, or CSI report configuration-related information.

i) The CSI-IM resource-related information may include CSI-IM resource information, CSI-IM resource set information, and so on. A CSI-IM resource set is identified by a CSI-IM resource set ID, and one CSI-IM resource set includes at least one CSI-IM resource. Each CSI-IM resource is identified by a CSI-IM resource ID.

ii) The CSI resource configuration-related information may be represented by a CSI-ResourceConfig information element (IE). The CSI resource configuration-related information defines a group including at least one of a non-zero power (NZP) CSI-RS resource set, a CSI-IM resource set, or a CSI-SSB resource set. That is, the CSI resource configuration-related information may include a CSI-RS resource set list, and the CSI-RS resource set list may include at least one of an NZP CSI-RS resource set list, a CSI-IM resource set list, or a CSI-SSB resource set list. The CSI-RS resource set is identified by a CSI-RS resource set ID, and one CSI-RS resource set includes at least one CSI-RS resource. Each CSI-RS resource is identified by a CSI-RS resource ID.

An RRC parameter indicating the use of a CSI-RS (e.g., a BM-related parameter 'repetition' and a tracking-related parameter 'trs-Info') may be configured for each NZP CSI-RS resource set.

iii) The CSI report configuration-related information includes a parameter indicating a time-domain behavior, reportConfigType and a parameter indicating a CSI-related quantity to be reported, reportQuantity. The time-domain behavior may be periodic, aperiodic, or semi-persistent.

The UE measures CSI based on the CSI-related configuration information (S1205). The CSI measurement may include (1) CSI-RS reception of the UE (S1203) and (2) CSI computation in the received CSI-RS (S1207). Mapping of the CSI-RS to REs of CSI-RS resources in the time and frequency domains is configured by an RRC parameter, CSI-RS-ResourceMapping.

The UE reports the measured CSI to the BS (S1209).

Beam Failure Recovery (BFR) Process

In a beamforming system, radio link failure (RLF) may occur frequently due to rotation or movement of a UE or beamforming blockage. Therefore, NR supports BFR to prevent frequent RLF occurrences. BFR is similar to RLF recovery and may be supported when the UE has knowledge of new candidate beam(s).

For beam failure detection, the BS configures an RS for beam failure detection for the UE. When the number of beam failure indications from the physical layer of the UE reaches a threshold set by RRC signaling within a period set by RRC signaling from the BS, the UE declares beam failure.

After detecting the beam failure, the UE triggers BFR by initiating a random access procedure on a PCell and performs BFR by selecting a suitable beam (if the BS has provided dedicated random access resources for certain beams, these are prioritized by the UE). Upon completion of the random access procedure, the UE considers that the BFR has been completed.

In the NR system, an SS/PBCH block and a CSI-RS which are periodically transmitted may be available as an RLM-RS which stands for an RS for radio link monitoring (RLM). Particularly in the case of multiple beams, although beam failure detection (BFD) is determined based on the channel quality of a serving beam, in-sync or out-of-sync may be determined based on the channel quality of all beams that the BS may potentially use for the UE as well as the channel quality of the serving beam during RLM. For this purpose, a plurality of SS/PBCH blocks or a plurality of CSI-RS resources may be configured as RLM-RS resources for RLM.

An SS/PBCH block may serve various purposes such as cell acquisition, time and frequency tracking, and RRM measurement for mobility support. Because the SS/PBCH block is always transmitted in a primary serving cell responsible for call setup, the SS/PBCH block may be used for RLM without additional resource allocation.

However, since the SS/PBCH block is transmitted in a narrowband even in a wideband system, the SS/PBCH block may not fully reflect the characteristics of a wideband channel. Moreover, the SS/PBCH block includes a large number of OFDM symbols, and thus transmission of the SS/PBCH block may impose a large overhead in a multi-beam system. In contrast, the CSI-RS may be transmitted in one OFDM symbol as well as in a wideband according to a resource configuration. Therefore, the use of the CSI-RS may be favorable for beam management and RLM depending on a system configuration. In the present disclosure, RLM based on a CSI-RS transmitted in a wideband will be described. For the convenience of description, embodiments of the present disclosure will be described with the appreciation that the terms SS/PBCH block and CSI-RS are generically referred to as RLM-RS.

In the NR system, RLM may be performed using a wideband RLM-RS. The operation of performing RLM using a wideband RLM-RS may also be performed in an unlicensed band. However, in the case of NR-U in which an NR system is operated in an unlicensed band operated by one operator, other systems such as Wi-Fi, licensed-assisted access (LAA) systems and/or an NR-U system managed by different operators may be operated simultaneously in the same band, unlike a licensed band.

For this purpose, a system operating in an unlicensed band performs clear channel assessment (CCA) before transmission in order to determine whether a channel is occupied by another system, for coexistence with other systems. That is, only when a frequency band in which a signal is to be transmitted is determined to be idle through CCA, the signal may be transmitted.

Basically in the case of CCA for a wideband RLM-RS, it may also be determined whether a channel is occupied for a total system band used by the UE. However, a frequency band available to the NR-U system may generally be larger than a basic frequency band used by an existing system such as Wi-Fi. For example, if the frequency band of an unlicensed band operated by the NR-U system is 80 MHz and a system such as Wi-Fi or LAA operates in units of 20 MHz, a channel may be determined to be occupied with a much higher probability in a CCA operation performed for 80 MHz. In other words, even if only one of four 20-MHz bands included in an 80-MHz band is occupied by another system, the total 80-MHz band may be determined to be occupied. Accordingly, the probability of determining the channel to be occupied may be increased.

Particularly for a periodically transmitted signal such as an RLM-RS, the probability of determining that the channel is occupied may be increased due to the above-described problem. Therefore, the probability of failing in transmitting the periodic signal within a time period allocated for the transmission of the periodic signal may increase. For example, for case when it is determined for the periodic signal that the channel is occupied by CCA, a plurality of candidate time positions available for transmission may be preconfigured in a specific time period to increase the transmission probability of the periodic signal. When LBT is failed at any one candidate time position, the transmission of the periodic signal may be delayed to the next available candidate time position. In this case, if it is determined that the channel is occupied due to CCA for the entire band of the periodic signal transmitted in a wideband, the UE may not periodically measure channel quality, thereby decreasing the reliability of the channel quality.

In this context, the present disclosure proposes a method of periodically transmitting a wideband RLM-RS and a method of allocating resources to the wideband RLM-RS, in consideration of LBT. In addition, a method of deriving an RLM measurement result based on the transmission method and the resource allocation method according to an embodiment of the present disclosure will be described.

Figure 13:
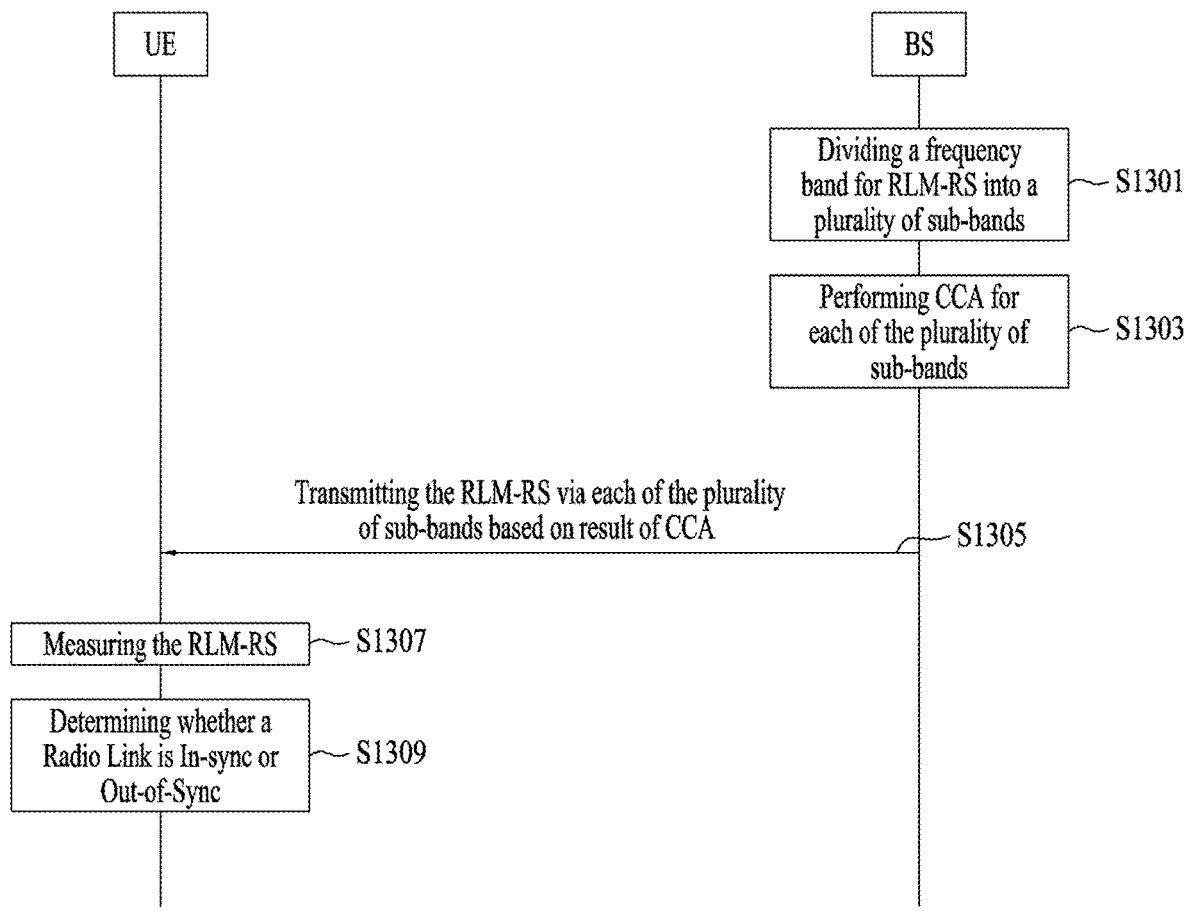
FIG. 13 is a diagram illustrating an implementation example of a base station (BS) operation and a UE operation according to the present disclosure.

With reference to FIG. 13, an implementation example of a network operation according to an embodiment of the present disclosure will be described.

Referring to FIG. 13, a BS divides a total frequency band to which an RLM-RS is allocated into a plurality of LBT sub-bands (S1301) and perform CCA on an LBT sub-band basis (S1303). The BS may then transmit the RLM-RS to a UE in each LBT sub-band based on the result of the CCA for the LBT sub-band (S1305). A specific method of transmitting an RLM-RS by performing CCA for each individual LBT sub-band in steps S1303 and S1305 may be based on Embodiment 1.

Upon receipt of the RLM-RS in each LBT sub-band, the UE may measure the RLM-RS (S1307), and determine whether a radio link is in-sync or out-of-sync based on the RLM-RS measurement result (S1309). A method of determining whether a radio link is in-sync or out-of-sync by a UE in steps S1307 and S1309 may be based on Embodiment 2 described later.

Embodiment 1. Wideband RLM-RS Transmission and LBT Operation

One RLM-RS resource may be allocated such that it has any frequency band within a system frequency band for the UE. As described above, however, a frequency band for RLM-RS resources is generally allocated to occupy all or most of the system frequency band. If the system frequency band is a wideband and the total frequency band is used as a frequency band for CCA (hereinafter, referred to as an LBT sub-band), the probability of failing in periodic transmission of the RLM-RS within a time period for the RLM-RS transmission may increase.

In a wideband system, therefore, it may be preferable to set the frequency band of an LBT sub-band to be smaller than the total system band. Further, an LBT sub-band used for transmission of the RLM-RS may also be set to be smaller than a frequency band configured for the RLM-RS. In the present disclosure, a 'wideband' may generally mean a wider frequency band than basic frequency bands used by other systems coexisting with the NR-U system.

In other words, when the transmission frequency band of the RLM-RS is larger than a sub-band for LBT, the RLM-RS may be transmitted in partial bands smaller than the frequency band configured for the RLM-RS. Specifically, the RLM-RS may be transmitted according to the following embodiments, and a method of measuring channel quality by a UE may also be performed according to the following embodiments.

(1) Embodiment 1-1

When the bandwidth of a wideband RLM-RS is about the size of N LBT sub-bands and M LBT sub-bands are determined to be idle, the RLM-RS may be transmitted only in the M LBT sub-bands, not in (N-M) LBT sub-bands. In this case, the UE may measure the channel quality of at least one of the M LBT sub-bands (the channel quality of up to M LBT sub-bands), and derive the channel quality of the entire bandwidth of the wideband RLM-RS based on the measurement.

In this case, the UE may attempt to measure channel quality at the position of an LBT sub-band expected to carry the RLM-RS. When the UE determines that the RLM-RS has not been transmitted in any LBT sub-band by the BS, the UE may attempt to detect the RLM-RS at an allocated candidate time position following a current candidate time position at which the channel quality measurement is attempted. For example, the UE may repeat the channel quality measurement until determining that the BS has successfully transmitted the RLM-RS in at least one of LBT sub-bands included in all candidate time positions.

(2) Embodiment 1-2

When the bandwidth of a wideband RLM-RS is about the size of N LBT sub-bands and M LBT sub-bands are determined to be idle, the RLM-RS may be transmitted only in the M LBT sub-bands, while after performing CCA for (N-M) LBT sub-bands at the next candidate time position set for delayed transmission of the RLM-RS, the delayed transmission of the RLM-RS may be performed when the channel is determined to be idle. In this case, the UE may measure channel quality for all candidate time positions at which delayed RLM-RS transmission is expected and use all possible results as the channel quality of the total band. However, when deriving the final channel quality, the UE may determine the number of LBT sub-bands of which the measurement results are to be used in consideration of the accuracy of the channel quality of each of at least one LBT sub-band.

(3) Embodiment 1-3

In Embodiment 1-1 or Embodiment 1-2, the UE may have to always measure the total frequency band. Therefore, when determining frequently that the channel is occupied, the UE may perform unnecessary channel quality measurement.

To reduce the resulting UE complexity, when the frequency band of the RLM-RS is larger than an LBT sub-band, the BS may configure a reference LBT sub-band among the LBT sub-bands and define a plurality of candidate time positions available for RLM-RS transmission in the reference LBT sub-band. When determining that the channel of the reference LBT sub-band is occupied, the BS may attempt delayed transmission of the RLM-RS in the reference LBT sub-band. However, if it is determined that the channel is occupied at an initial RLM-RS transmission position in any LBT sub-band other than the reference LBT sub-band, an additional attempt of RLM-RS transmission may not be performed. In this case, the UE may measure channel quality and determine whether the RLM-RS has been transmitted, only at the initial RLM-RS transmission position in all LBT sub-bands, while performing the measurement and determination operation at the other candidate time positions only in the reference LBT sub-band. Further, this operation may reduce the UE complexity.

(4) Embodiment 1-4

When determining that the channel is occupied in at least one of the LBT sub-bands, all of RLM-RS are not transmitted in all LBT sub-bands and the BS may configure the operation of Embodiment 1-1 or Embodiment 1-2 for the UE. In this case, the UE may also measure channel quality based on Embodiment 1-1 or Embodiment 1-2 according to a configuration from the BS. If there is no configuration based on Embodiment 1-1 or 1-2, the UE may determine for the total band whether the RLM-RS has been transmitted, and determine whether the channel quality measurement performed in the total frequency band is valid.

Similarly to allocation of one RLM-RS resource and transmission of the RLM-RS in a partial band through CCA as in Embodiments 1-1 to 1-4, a plurality of RLM-RS resources for one beam may be allocated on an LBT sub-band basis, and the plurality of allocated RLM-RS resources may be grouped into an RLM-RS resource set. Since each of these RLM-RS resource sets corresponds to one beam, the UE may derive one measurement metric for one RLM-RS resource set.

In this case, the RLM-RS transmission operation of the BS and the related operation of the UE may be performed in the same manner as in Embodiment 1-1 and Embodiment 1-2. However, while partial band transmission is performed in each LBT sub-band for one RLM-RS resource in Embodiment 1-1, CCA and RLM-RS transmission may be performed in each individual LBT sub-band including an RLM-RS resource, for each RLM-RS resource in the above-described case.

In other words, when the UE measures channel quality, the UE may derive one representative channel quality measurement result from the RLM-RS resources of one RLM-RS resource set, although a plurality of RLM-RS resources have been allocated.

The above-described LBT operation of an RLM-RS may be applied in the same manner not only to RLM but also to RRM measurement using a radio resource management-reference signal (RRM-RS) for supporting mobility or beam tracking using a beam management-reference signal (BM-RS), which is similar to RLM.

Embodiment 2: In-Sync/Out-of-Sync Determination Method Based on Partial Band Transmission The RLM-RS transmission methods of Embodiments 1-1 to 1-4 enable transmission of a wideband RLM-RS configured for a wideband system in a partial band. In regards to such partial band transmission of a wideband signal, the UE may receive the RLM-RS on an LBT sub-band basis. Further, the BS may determine whether to transmit the RLM-RS according to LBT on an LBT sub-band basis.

In Embodiment 2, a method of determining whether to transmit an RLM-RS on an LBT sub-band basis by a BS and then determining the channel quality of a total system frequency band accordingly by a UE will be described below.

A channel quality determination method may mean a method of determining in-sync or out-of-sync for each beam in RLM. In the NR system, when the channel quality of each of all configured beams is out-of-sync, the cell may be finally determined to be out-of-sync. Therefore, unless otherwise specified, in-sync/out-of-sync or channel quality may mean in-sync/out-of-sync for each beam or channel quality for each beam in Embodiments 2-1 to 2-4 described later. A final channel quality result may follow the definition of in-sync/out-of-sync in the NR system.

(1) Embodiment 2-1

The UE may determine for each LBT sub-band whether the RLM-RS has been transmitted, and select one representative LBT sub-band from among LBT sub-bands determined to carry the RLM-RS. The UE may calculate subcarrier signal-to-noise ratios (SNRs) for the selected LBT sub-band, and obtain an average SNR or a hypothetical PDCCH block error rate (BLER) based on the subcarrier SNRs. Since the average SNR and/or the hypothetical PDCCH BLER represents the channel quality of the total frequency band, in-sync/out-of-sync may be determined using the average SNR or the hypothetical PDCCH BLER. In other words, although the BS transmits the wideband RLM-RS over a plurality of LBT sub-bands, the UE may perform final RLM in one LBT sub-band.

(2) Embodiment 2-2

According to Embodiment 2-1, the channel quality of a total wideband may not be obtained from a transmitted wideband RLM-RS, only with an effect of increasing the possibility of periodic transmission of the RLM-RS. Accordingly, a method of determining in-sync/out-of-sync to obtain channel quality for as wide a frequency band as possible as well as to increase the possibility of periodic transmission of the RLM-RS will be described in Embodiment 2-2.

For this purpose, the subcarrier SNRs and average SNR of each LBT sub-band may be calculated, and LBT may be determined for the LBT sub-band. Then, the average SNR and/or hypothetical PDCCH BLER of RLM-RS resources or an RLM-RS resource set may be obtained using the subcarrier SNRs and average SNR of an LBT sub-band determined to carry the RLM-RS. Further, in-sync/out-of-sync may be determined using the obtained average SNR and/or hypothetical PDCCH BLER value and a Qin/Qout value of the RLM-RS resources or RLM-RS resource set.

(3) Embodiment 2-3

Determination as to whether the RLM-RS has been transmitted based on LBT in a low SNR environment may bring a high probability of missing or a high probability of false alarm. In this case, it may be determined that the RLM-RS has not been transmitted even though an actual SNR is measured higher than Qout according to a used decision metric. On the contrary, it may be determined that the RLM-RS has been transmitted even though the actual SNR is measured lower than Qout.

As such, when there is an error in determining whether LBT is successful, the error may significantly affect the average SNR and/or hypothetical PDCCH BLER of RLM-RS resources or an RLM-RS resource set according to the accuracy of determining whether the RLM-RS has been transmitted based on LBT. To mitigate this effect, in-sync/out-of-sync may be determined for each LBT sub-band. When out-of-sync is determined for all LBT sub-bands, the channel quality of the RLM-RS resources or the RLM-RS resource set may be determined to be out-of-sync. However, in the case where all LBT sub-bands are determined to be out-of-sync, only when it is determined that the RLM-RS has been transmitted in at least one LBT sub-band, the RLM-RS resources may be finally determined to be out-of-sync. That is, when it is determined that the RLM-RS has not been transmitted in any LBT sub-band, out-of-sync may not be determined even through the SNRs of all LBT sub-bands are lower than Qout.

In-sync may be defined as a state other than out-of-sync. In other words, if at least one LBT sub-band is determined to be in-sync, the channel quality of the RLM-RS resources may be defined as in-sync.

(4) Embodiment 2-4

Similarly to Embodiment 2-3, the average SNR and/or hypothetical PDCCH BLER may be measured for each LBT sub-band, and in-sync/out-of-sync may be determined based on an LBT sub-band having the highest average SNR and/or the lowest BLER. It may also be determined based on the above determination whether the RLM-RS resources or the RLM-RS resource set is in-sync/out-of-sync.

Figure 14:
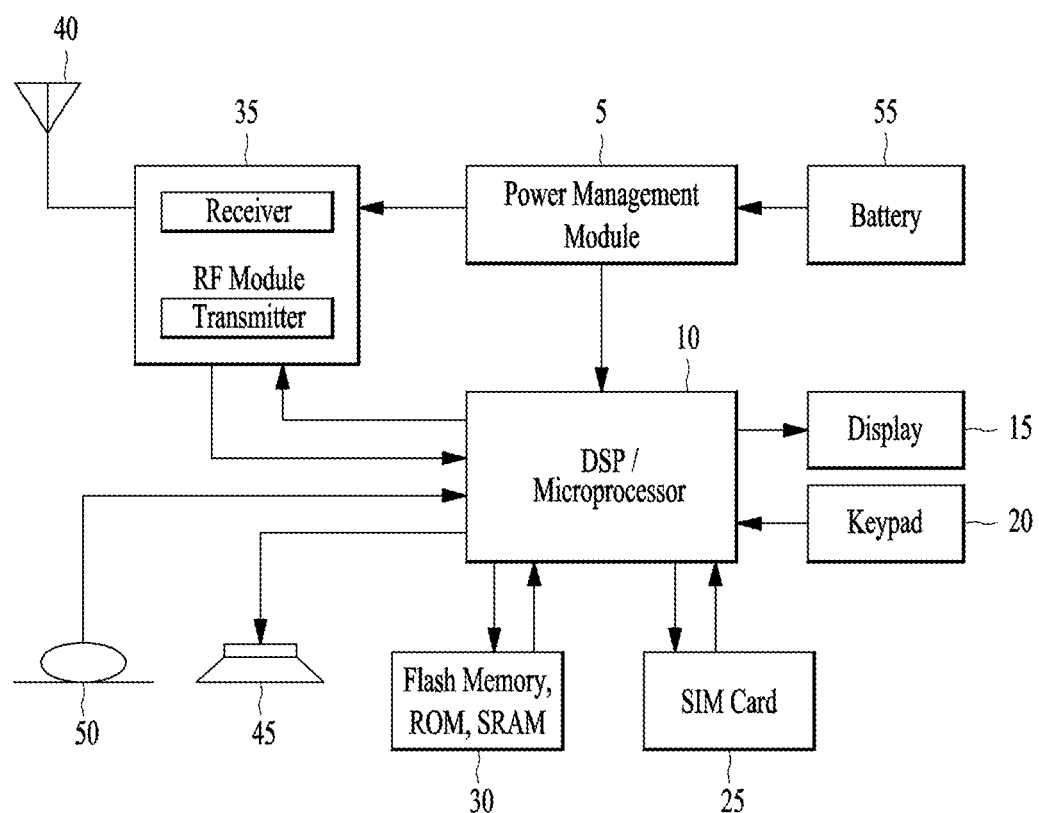
FIG. 14 is a block diagram illustrating components of a wireless device for implementing the present disclosure.

FIG. 14 illustrates an example of a wireless communication device according to an embodiment of the present disclosure.

The wireless communication device illustrated in FIG. 19 may represent a UE and/or a BS according to an embodiment of the present disclosure. However, the wireless communication device of FIG. 14 may be replaced with any of various types of devices such as a vehicle communication system or device, a wearable device, and a laptop, not limited to the UE and/or the BS according to the embodiment of the present disclosure. More specifically, the wireless communication device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an AR device, a VR device, an MTC device, an IoT device, medical equipment, a FinTech device (or financial device), a security device, a weather/environmental device, and a device related to $4^{th}$ industrial revolution fields or 5G services. For example, the UAV may be an unmanned aircraft flying according to a wireless control signal. For example, the MTC device and the IoT device do not need direct human intervention or manipulation, including a smart meter, a vending machine, a thermometer, a smart bulb, a door lock, and various sensors. For example, the medical equipment refers to a device designed to diagnose, remedy, alleviate, treat, or prevent diseases or a device that examines, replaces or modifies a structure or function, including diagnosis equipment, a surgery device, an (in vitro) diagnostic kit, a hearing aid, and a procedure device. For example, the security device is installed to prevent probable dangers and maintain safety, including a camera, a closed-circuit television (CCTV), and a black box. For example, the FinTech device is a device that provides financial services such as mobile payment, including a payment device and point of sales (POS) terminal. For example, the weather/environmental device may refer to a device that monitors and predicts weather/environment.

Further, the transmitting UE and the receiving UE may include a portable phone, a smartphone, a laptop computer, a digital broadcasting terminal, a personal digital assistant (PDA), a portable multimedia player (PMP), a navigator, a slate personal computer (PC), a tablet PC, an ultrabook, a wearable device (e.g., a smart watch, smart glasses, a head-mounted display (HMD)), and a foldable device. For example, the HMD is a display device wearable on the head, which may be used to implement VR or AR.

Referring to FIG. 14, the UE and/or the BS according to the embodiment of the present disclosure includes at least one processor 10 such as a digital signal processor or a microprocessor, a transceiver 35, a power management module 5, an antenna 40, a battery 55, a display 15, a keypad 20, a memory 30, a subscriber identity module (SIM) card 25, a speaker 45, and a microphone 50. In addition, the UE and/or the BS may include one or more antennas. The transceiver 35 may be also referred to as an RF module.

The at least one processor 10 may be configured to implement the functions, procedures and/or methods described with reference to FIGS. 1 to 13. In at least some of the embodiments described with reference to FIGS. 1 to 13, the at least one processor 10 may implement one or more protocols, such as layers of radio interface protocols (e.g., functional layers).

The memory 30 is coupled to the at least one processor 10 and stores information related to the operations of the at least one processor 10. The memory 30 may be located inside or outside the at least one processor 10 and may be coupled to the at least one processor 10 by various techniques such as wired or wireless communication.

A user may input various types of information (e.g., indication information such as a telephone number) by various techniques such as pressing a button on the keypad 20 or activating voice using the microphone 50. The at least one processor 10 executes appropriate functions such as receiving and/or processing information of the user and dialing a telephone number.

It is also possible to retrieve data (e.g., operational data) from the SIM card 25 or the memory 30 to execute the appropriate functions. In addition, the at least one processor 10 may receive and process global positioning system (GPS) information from a GPS chip to obtain location information about the UE and/or the BS such as in vehicle navigation, map service, or the like, or execute functions related to the location information. Further, the at least one processor 10 may display these various types of information and data on the display 15 for reference and user convenience.

The transceiver 35 is coupled to the at least one processor 10 to transmit and/or receive wireless signals such as RF signals. The at least one processor 10 may control the transceiver 35 to initiate communication and transmit wireless signals including various types of information or data, such as voice communication data. The transceiver 35 may include a receiver for receiving a wireless signal and a transmitter for transmitting a wireless signal. The antenna 40 facilitates the transmission and reception of wireless signals. In some embodiments, upon receipt of a wireless signal, the transceiver 35 may forward and convert the signal to a baseband frequency for processing by the at least one processor 10. The processed signal may be processed according to various techniques, such as being converted into audible or readable information, and output through the speaker 45.

In some embodiments, a sensor may also be coupled to the at least one processor 10. The sensor may include one or more sensing devices configured to detect various types of information, including velocity, acceleration, light, vibration, and the like. The at least one processor 10 receives and processes sensor information obtained from the sensor, such as proximity, position, image, and the like, thereby executing various functions such as collision avoidance and autonomous driving.

Various components such as a camera and a universal serial bus (USB) port may further be included in the UE and/or the BS. For example, a camera may further be coupled to the at least one processor 10, for use in various services including autonomous driving and vehicle safety services.

FIG. 14 merely illustrates one example of devices included in a UE and/or a BS, not limiting the present disclosure. For example, some components, such as the keypad 20, the GPS chip, the sensor, the speaker 45 and/or the microphone 50 may be excluded from UE and/or BS implementation in some embodiments.

Specifically, when the wireless communication device illustrated in FIG. 14 is a UE according to an embodiment of the present disclosure, a UE operation will be described in order to implement the embodiments of the present disclosure. When the wireless communication device is a UE according to an embodiment of the present disclosure, the processor 10 may receive an RLM-RS transmitted based on the result of CCA for each of a plurality of LBT sub-bands through the transceiver 35. A specific method of receiving an RLM-RS in each of a plurality of LBT sub-bands may be based on Embodiment 1 described above.

The processor 10 may measure the received RLM-RS, and determine whether a radio link is in-sync or out-of-sync based on the result of the RLM-RS measurement. A method of determining whether a radio link is in-sync/out-of-sync by the processor 10 may be based on Embodiment 2 described above.

When the wireless communication device illustrated in FIG. 14 is a BS according to an embodiment of the present disclosure to implement the embodiments of the present disclosure, the processor 10 may divide a total frequency band to which an RLM-RS is allocated into a plurality of LBT sub-bands, and perform CCA for each LBT sub-band. The processor 10 may then control the transceiver 35 to transmit the RLM-RS to a UE in each LBT sub-band based on the result of the CCA in the LBT sub-band. In this case, a specific method of transmitting an RLM-RS by performing CCA in each LBT sub-band may be based on Embodiment 1 described above.

Further, the processor 10 may receive a report indicating whether the radio link is in-sync/out-of-sync as determined by the UE through the transceiver 35. In this case, a method of determining whether a radio link is in-sync/out-of-sync may be based on Embodiment 2 described above.

Figure 15:
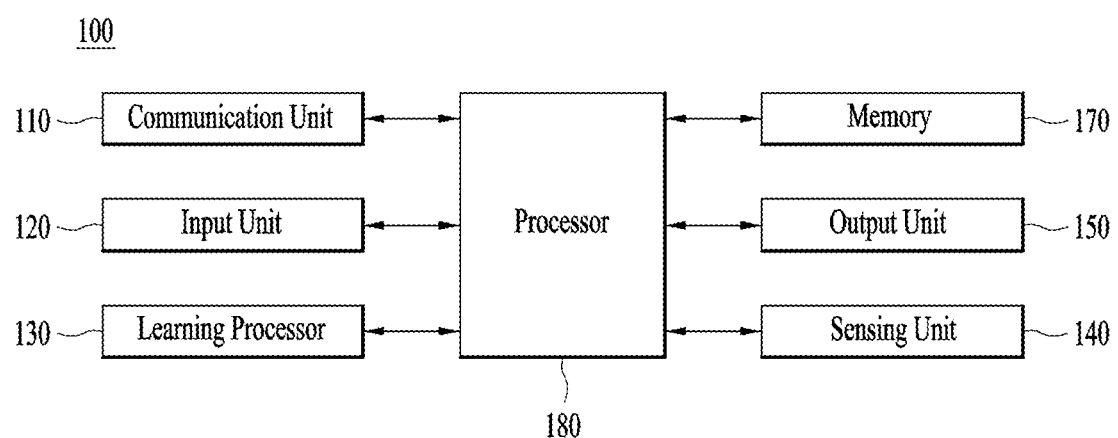
FIGS. 15, 16 and 17 are diagrams illustrating an artificial intelligence (AI) apparatus and AI system for implementing embodiments of the present disclosure.

FIG. 15 illustrates an AI device 100 according to an embodiment of the present disclosure.

The AI device 100 may be implemented by a stationary or mobile device, for example, a TV, a projector, a mobile phone, a smartphone, a desktop computer, a laptop computer, a digital broadcasting terminal, a personal digital assistant (PDA), a portable multimedia player (PMP), a navigation device, a tablet PC, a wearable device, a set-top box (STB), a digital multimedia broadcasting (DMB) receiver, a radio, a washing machine, a refrigerator, a desktop computer, a digital signage, a robot, a vehicle, etc.

Referring to FIG. 15, the AI device 100 may include a communication unit 110, an input unit 120, a learning processor 130, a sensing unit 140, an output unit 150, a memory 170, and a processor 180.

The communication unit 110 may transmit and receive data to and from external devices such as an AI server 200 and other AI devices 100a to 100e based on wired or wireless communication technology. For example, the communication unit 110 may transmit and receive sensor information, user inputs, learning models, and control signals to and from the external devices.

The communication technology used by the communication unit 110 includes Global System for Mobile communication (GSM), Code Division Multiple Access (CDM), Long Term Evolution (LTE), 5G, Wireless Local Area Network (WLAN), Wireless Fidelity (Wi-Fi), Bluetooth™, Radio Frequency Identification (RFID), Infrared Data Association (IrDA), ZigBee, Near Field Communication (NFC), etc.

The input unit 120 may obtain various types of data.

The input unit 120 may include a camera for inputting a video signal, a microphone for receiving an audio signal, and a user input unit for receiving information from a user. The camera or microphone may be treated as a sensor, and the signal obtained from the camera or microphone may be considered as sensing data or sensor information.

The input unit 120 may obtain learning data for a learning model and input data to be used when an output is obtained based on the learning model. The input unit 120 may obtain raw input data. In this case, the processor 180 or learning processor 130 may extract an input feature by preprocessing the input data.

The learning processor 130 may train a model configured with an ANN based on the learning data. Here, the trained ANN may be referred to as the learning model. The learning model may be used to infer a result value for new input data rather than the learning data, and the inferred value may be used as a basis for determining whether to perform a certain operation.

In this case, the learning processor 130 may perform AI processing together with a learning processor 240 of the AI server 200.

The learning processor 130 may include a memory integrated with or implemented in the AI device 100. Alternatively, the learning processor 130 may be implemented with the memory 170, an external memory directly coupled to the AI device 100, or a memory in an external device.

The sensing unit 140 may obtain at least one of internal information of the AI device 100, surrounding environment information of the AI device 100, and user information using various sensors.

The sensor included in the sensing unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a LIDAR, a radar, and the like.

The output unit 150 may generate an output related to visual, audible, or tactile sense.

The output unit 150 may include a display unit for outputting visual information, a speaker for outputting audible information, a haptic module for outputting tactile information, and the like.

The memory 170 may store data supporting various functions of the AI device 100. For example, the memory 170 may store input data, learning data, learning models, learning histories, etc. obtained by the input unit 120.

The processor 180 may determine at least one executable operation of the AI device 100 based on information determined or generated by a data analysis algorithm or machine learning algorithm. The processor 180 may control the components of the AI device 100 to perform the determined operation.

To this end, the processor 180 may request, search for, receive, or employ data of the learning processor 130 or memory 170 and control the components of the AI device 100 to execute an expected or preferable operation or among the one or more executable operations.

If the processor 180 requires association with an external device to perform the determined operation, the processor 180 may generate a control signal for controlling the corresponding external device and transmit the generated control signal to the external device.

The processor 180 may obtain intention information from a user input and determine the intention of the user based on the obtained intention information.

In this case, the processor 180 may obtain the intention information corresponding to the user input using at least one of a speech to text (STT) engine for converting a voice input into a character string or a natural language processing (NLP) engine for obtaining intention information from a natural language.

At least one of the STT engine and the NLP engine may be configured with the ANN of which at least a part is trained according to the machine learning algorithm. At least one of the STT engine and the NLP engine may be trained by the learning processor 130, by the learning processor 240 of the AI server 200, or by distributed processing thereof.

The processor 180 may collect history information including user feedback on the operation of the AI device 100 and details thereof. The processor 180 may store the history information in the memory 170 or learning processor 130 or transmit the history information to an external device such as the AI server 200. The collected history information may be used to update the learning model.

The processor 180 may control at least some of the components of the AI device 100 to drive an application program stored in the memory 170. Further, the processor 180 may operate two or more of the components included in the AI device 100 in combination to drive the application program.

Figure 16:
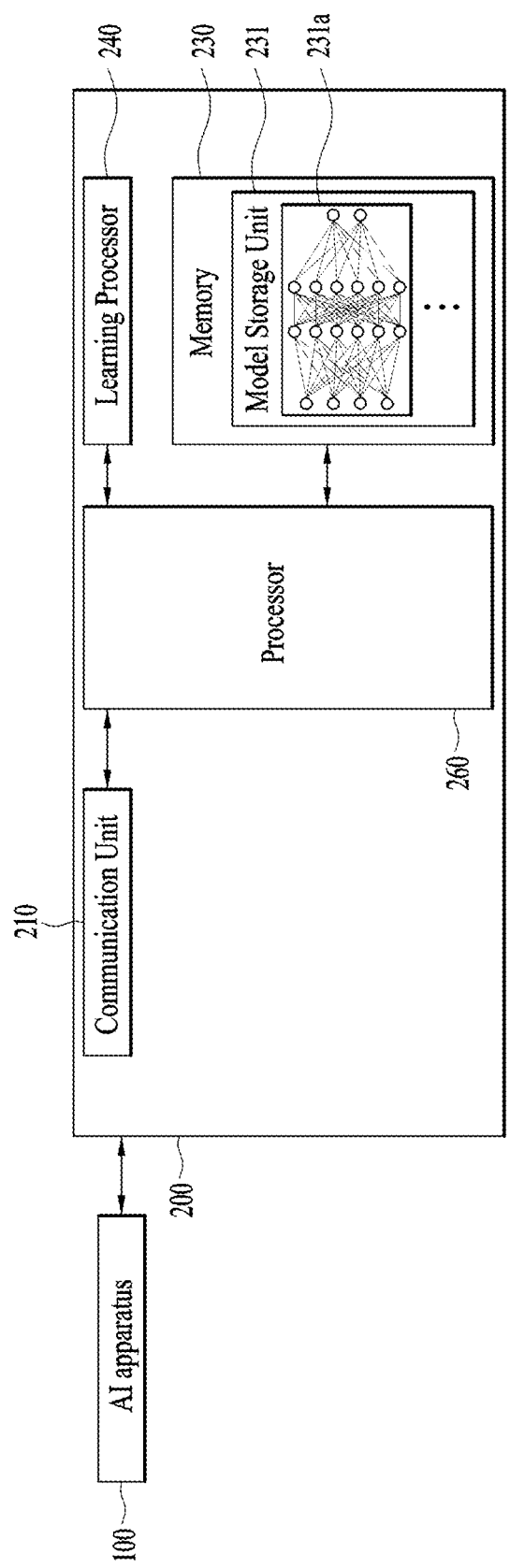

FIG. 16 illustrates the AI server 200 according to an embodiment of the present disclosure.

Referring to FIG. 16, the AI server 200 may mean a device for training an ANN based on a machine learning algorithm or a device for using a trained ANN. Here, the AI server 200 may include a plurality of servers to perform distributed processing or may be defined as a 5G network. The AI server 200 may be included as a part of the AI device 100 to perform at least part of AI processing together.

The AI server 200 may include a communication unit 210, a memory 230, the learning processor 240, a processor 260, and the like.

The communication unit 210 may transmit and receive data to and from an external device such as the AI device 100.

The memory 230 may include a model storage unit 231. The model storage unit 231 may store a model being trained or trained (or an ANN 231*a*) through the learning processor 240.

The learning processor 240 may train the ANN 231*a* based on learning data. The ANN, i.e., a learning model may be included in the AI server 200 or in an external device such as the AI device 100.

The learning model may be implemented by hardware, software or a combination thereof. If a part or the entirety of the learning model is implemented with software, one or more instructions for the learning model may be stored in the memory 230.

The processor 260 may infer a result value for new input data based on the learning model and generate a response or control command based on the inferred result value.

Figure 17:
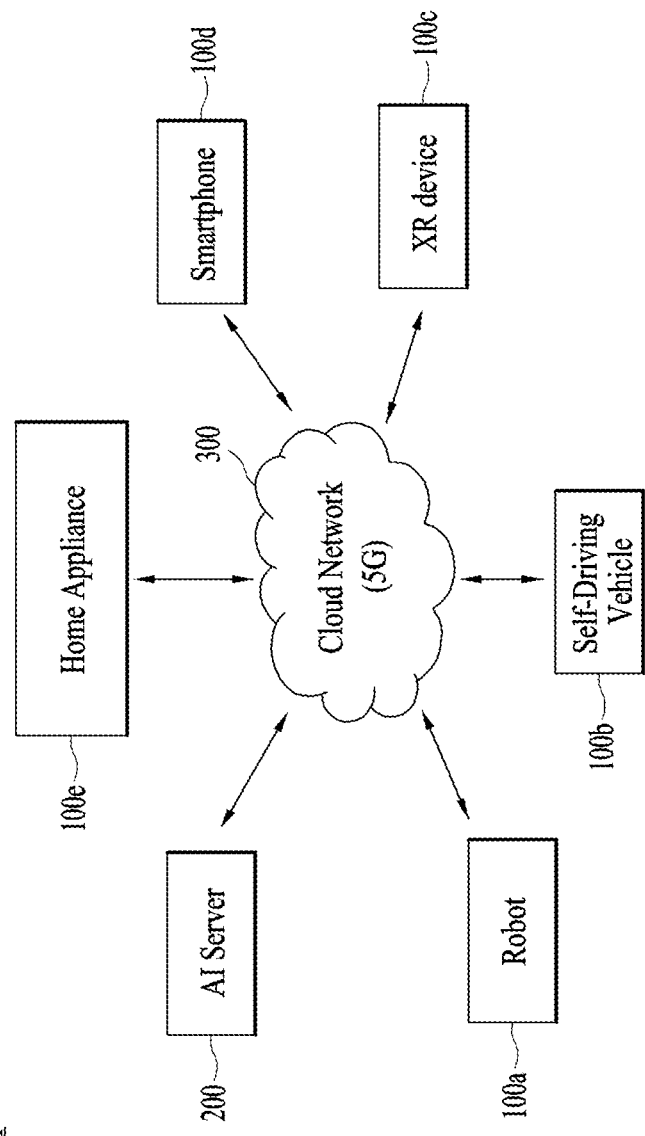

FIG. 17 illustrates an AI system 1 according to an embodiment of the present disclosure.

Referring to FIG. 17, at least one of the AI server 200, a robot 100*a*, an autonomous driving vehicle 100*b*, an XR device 100*c*, a smartphone 100*d*, and a home appliance 100*e* is connected to a cloud server 10 in the AI system 1. Here, the robot 100*a*, the autonomous vehicle 100*b*, the XR device 100*c*, the smartphone 100*d*, or the home appliance 100*e*, to which the AI technology is applied, may be referred to as an AI device 100*a* to 100*e*.

The cloud network 10 may refer to a network configuring part of a cloud computing infrastructure or a network existing in the cloud computing infrastructure. Here, the cloud network 10 may be configured with a 3G network, a 4G or LTE network, or a 5G network.

That is, each of the devices 100*a* to 100*e* and 200 included in the AI system 1 may be connected to each other through the cloud network 10. In particular, the devices 100*a* to 100*e* and 200 may communicate with each other through a B S or may communicate with each other directly without the BS.

The AI server 200 may include a server in charge of AI processing and a server in charge of big data computation.

The AI server 200 may be connected to at least one of the robot 100*a*, the autonomous vehicle 100*b*, the XR device 100*c*, the smartphone 100*d*, or the home appliance 100*e* included in the AI system 1 via the cloud network 10 and help at least part of AI processing of the connected AI devices 100*a* to 100*e*.

In this case, the AI server 200 may train an ANN according to a machine learning algorithm on behalf of the AI devices 100*a* to 100*e* and directly store or transmit a learning model to the AI devices 100*a* to 100*e*.

The AI server 200 may receive input data from the AI devices 100*a* to 100*e*, infer a result value for the received input data based on the learning model, generate a response or control command based on the inferred result value, and transmit the response or control command to the AI devices 100*a* to 100*e*.

Alternatively, the AI devices 100*a* to 100*e* may directly infer the result value for the input data based on the learning model and generate the response or control command based on the inferred result value.

Hereinafter, various embodiments of the AI devices 100*a* to 100*e* to which the above-described technology is applied will be described. The AI devices 100*a* to 100*e* illustrated in FIG. 17 may be considered as a specific example of the AI device 100 illustrated in FIG. 15.

<AI+Robot>

If the AI technology is applied to the robot 100*a*, the robot 100*a* may be implemented as a guide robot, a transport robot, a cleaning robot, a wearable robot, an entertainment robot, a pet robot, an unmanned flying robot, etc.

The robot 100*a* may include a robot control module for controlling an operation, and the robot control module may refer to a software module or a chip implemented by hardware.

The robot 100*a* may obtain state information of the robot 100*a*, detect (recognize) a surrounding environment and objects, generate map data, determine a travel route or driving plan, or determine a response or action to user interaction by using sensor information obtained from various types of sensors.

To determine the travel route or driving plan, the robot 100*a* may use sensor information obtained from at least one of the following sensors: a LIDAR, a radar, and a camera to determine a movement route and a travel plan.

The robot 100*a* may perform the above-described operations based on a learning model configured with at least one ANN. For example, the robot 100*a* may recognize the surrounding environment and objects based on the learning model and determine an operation based on the recognized surrounding environment or object. Here, the learning model may be directly trained by the robot 100*a* or by an external device such as the AI server 200.

The robot 100*a* may operate by directly generating a result based on the learning model. Alternatively, the robot 100*a* may transmit sensor information to the external device such as the AI server 200 and receive a result generated based on the sensor information.

The robot 100*a* may determine the travel route and driving plan based on at least one of the map data, the object information detected from the sensor information, or the object information obtained from the external device. Then, the robot 100*a* may move according to the determined travel path and driving plan under control of its driving unit.

The map data may include object identification information about various objects placed in a space in which the robot 100*a* moves. For example, the map data may include object identification information about fixed objects such as walls and doors and movable objects such as flower pots and desks. The object identification information may include a name, a type, a distance, a position, etc.

The robot 100*a* may operate and move by controlling the driving unit based on the user control/interaction. In this case, the robot 100*a* may obtain intention information from the motion or speech of the user and determine a response based on the obtained intention information.

<AI+Autonomous Driving>

If the AI technology is applied to the autonomous driving vehicle 100*b*, the autonomous driving vehicle 100*b* may be implemented as a mobile robot, a vehicle, an unmanned flying vehicle, etc.

The autonomous driving vehicle 100*b* may include an autonomous driving control module for controlling the autonomous driving function, and the autonomous driving control module may refer to a software module or a chip implemented by hardware. The autonomous driving control module may be included in the autonomous driving vehicle 100*b* as a component thereof, but it may be implemented with separate hardware and connected to the outside of the autonomous driving vehicle 100*b*.

The autonomous driving vehicle 100*b* may obtain state information about the autonomous driving vehicle 100*b* based on sensor information acquired from various types of sensors, detect (recognize) a surrounding environment and objects, generate map data, determine a travel route and driving plan, or determine an operation.

Similarly to the robot 100*a*, the autonomous driving vehicle 100*b* may use the sensor information obtained from at least one of the following sensors: a LIDAR, a radar, and a camera so as to determine the travel route and driving plan.

In particular, the autonomous driving vehicle 100*b* may recognize an environment and objects in an area hidden from view or an area over a certain distance by receiving the sensor information from external devices. Alternatively, the autonomous driving vehicle 100*b* may receive information, which is recognized by the external devices.

The autonomous driving vehicle 100*b* may perform the above-described operations based on a learning model configured with at least one ANN. For example, the autonomous driving vehicle 100*b* may recognize the surrounding environment and objects based on the learning model and determine the driving path based on the recognized surrounding environment and objects. The learning model may be trained by the autonomous driving vehicle 100*a* or an external device such as the AI server 200.

The autonomous driving vehicle 100*b* may operate by directly generating a result based on the learning model. Alternatively, the autonomous driving vehicle 100*b* may transmit sensor information to the external device such as the AI server 200 and receive a result generated based on the sensor information.

The autonomous driving vehicle 100*b* may determine the travel route and driving plan based on at least one of the map data, the object information detected from the sensor information, or the object information obtained from the external device. Then, the autonomous driving vehicle 100*b* may move according to the determined travel path and driving plan under control of its driving unit.

The map data may include object identification information about various objects placed in a space (e.g., road) in which the autonomous driving vehicle 100*b* moves. For example, the map data may include object identification information about fixed objects such as street lamps, rocks, and buildings and movable objects such as vehicles and pedestrians. The object identification information may include a name, a type, a distance, a position, etc.

The autonomous driving vehicle 100*b* may operate and move by controlling the driving unit based on the user control/interaction. In this case, the autonomous driving vehicle 100*b* may obtain intention information from the motion or speech of a user and determine a response based on the obtained intention information.

<AI+XR>

When the AI technology is applied to the XR device 100*c*, the XR device 100*c* may be implemented as a HMD, a HUD mounted in vehicles, a TV, a mobile phone, a smartphone, a computer, a wearable device, a home appliance, a digital signage, a vehicle, a fixed robot, a mobile robot, etc.

The XR device 100*c* may analyze three-dimensional point cloud data or image data obtained from various sensors or external devices, generate position data and attribute data for three-dimensional points, obtain information about a surrounding environment or information about a real object, perform rendering to on an XR object, and then output the XR object. For example, the XR device 100*c* may output an XR object including information about a recognized object, that is, by matching the XR object with the recognized object.

The XR device 100*c* may perform the above-described operations based on a learning model configured with at least one ANN. For example, the XR device 100*c* may recognize the real object from the three-dimensional point cloud data or image data based on the learning model and provide information corresponding to the recognized real object. The learning model may be directly trained by the XR device 100*c* or an external device such as the AI server 200.

The XR device 100*c* may operate by directly generating a result based on the learning model. Alternatively, the XR device 100*c* may transmit sensor information to the external device such as the AI server 200 and receive a result generated based on the sensor information.

<AI+Robot+Autonomous Driving>

When the AI technology and the autonomous driving technology are applied to the robot 100*a*, the robot 100*a* may be implemented as a guide robot, a transport robot, a cleaning robot, a wearable robot, an entertainment robot, a pet robot, an unmanned flying robot, etc.

The robot 100*a* to which the AI technology and the autonomous driving technology are applied may refer to the robot 100*a* with the autonomous driving function or the robot 100*a* interacting with the autonomous driving vehicle 100*b*.

The robot 100*a* having the autonomous driving function may be collectively referred to as a device that move along a given movement path without human control or a device that moves by autonomously determining its movement path.

The robot 100*a* having the autonomous driving function and the autonomous driving vehicle 100*b* may use a common sensing method to determine either a travel route or a driving plan. For example, the robot 100*a* having the autonomous driving function and the autonomous driving vehicle 100*b* may determine either the travel route or the driving plan based on information sensed through a LIDAR, a radar, and a camera.

The robot 100*a* interacting with the autonomous driving vehicle 100*b* may exist separately from with the autonomous driving vehicle 100*b*. That is, the robot 100*a* may perform operations associated with the autonomous driving function inside or outside the autonomous driving vehicle 100*b* or interwork with a user on the autonomous driving vehicle 100*b*.

The robot 100*a* interacting with the autonomous driving vehicle 100*b* may control or assist the autonomous driving function of the autonomous driving vehicle 100*b* by obtaining sensor information on behalf of the autonomous driving vehicle 100*b* and providing the sensor information to the autonomous driving vehicle 100*b* or by obtaining sensor information, generating environment information or object information, and providing the information to the autonomous driving vehicle 100*b*.

Alternatively, the robot 100*a* interacting with the autonomous driving vehicle 100*b* may monitor the user on the autonomous driving vehicle 100*b* or control the autonomous driving vehicle 100*b* through the interaction with the user. For example, when it is determined that the driver is in a drowsy state, the robot 100*a* may activate the autonomous driving function of the autonomous driving vehicle 100*b* or assist the control of the driving unit of the autonomous driving vehicle 100*b*. The function of the autonomous driving vehicle 100*b* controlled by the robot 100*a* may include not only the autonomous driving function but also functions installed in the navigation system or audio system provided in the autonomous driving vehicle 100*b*.

Alternatively, the robot 100*a* interacting with the autonomous driving vehicle 100*b* may provide information to the autonomous driving vehicle 100*b* outside the autonomous driving vehicle 100*b* or assist the autonomous driving vehicle 100*b* outside the autonomous driving vehicle 100*b*. For example, the robot 100*a* may provide traffic information including signal information such as smart traffic lights to the autonomous driving vehicle 100*b* or automatically connect an electric charger to a charging port by interacting with the autonomous driving vehicle 100*b* like an automatic electric charger installed in an electric vehicle.

<AI+Robot+XR>

When the AI technology and the XR technology are applied to the robot 100*a*, the robot 100*a* may be implemented as a guide robot, a transport robot, a cleaning robot, a wearable robot, an entertainment robot, a pet robot, an unmanned flying robot, a drone, etc.

The robot 100*a* to which the XR technology is applied may refer to a robot subjected to control/interaction in an XR image. In this case, the robot 100*a* may be separated from the XR device 100*c* but interact with the XR device 100*c*.

When the robot 100*a* subjected to control/interaction in the XR image obtains sensor information from sensors including a camera, the robot 100*a* or XR device 100*c* may generate the XR image based on the sensor information, and then the XR device 100*c* may output the generated XR image. The robot 100*a* may operate based on a control signal input through the XR device 100*c* or user interaction.

For example, a user may confirm the XR image corresponding to the perspective of the robot 100*a* remotely controlled through an external device such as the XR device 100*c*. Then, the user may adjust the autonomous driving path of the robot 100*a* or control the operation or movement of the robot 100*a* through interaction therewith or check information about surrounding objects.

<AI+Autonomous Driving+XR>

When the AI technology and the XR technology is applied to the autonomous driving vehicle 100*b*, the autonomous driving vehicle 100*b* may be implemented as a mobile robot, a vehicle, an unmanned flying vehicle, etc.

The autonomous driving vehicle 100*b* to which the XR technology is applied may refer to an autonomous driving vehicle capable of providing an XR image or an autonomous driving vehicle subjected to control/interaction in an XR image. In particular, the autonomous driving vehicle 100*b* subjected to control/interaction in the XR image may be separated from the XR device 100*c* but interact with the XR device 100*c*.

The autonomous driving vehicle 100*b* capable of providing the XR image may obtain sensor information from sensors including a camera and output the generated XR image based on the obtained sensor information. For example, the autonomous driving vehicle 100*b* may include an HUD for outputting an XR image, thereby providing a user with an XR object corresponding to an object in the screen together with a real object.

When the XR object is displayed on the HUD, at least part of the XR object may overlap with the real object which the user look at. On the other hand, when the XR object is displayed on a display provided in the autonomous driving vehicle 100*b*, at least part of the XR object may overlap with the object in the screen. For example, the autonomous driving vehicle 100*b* may output XR objects corresponding to objects such as a lane, another vehicle, a traffic light, a traffic sign, a two-wheeled vehicle, a pedestrian, a building, etc.

When the autonomous driving vehicle 100*b* subjected to control/interaction in the XR image may obtain the sensor information from the sensors including the camera, the autonomous driving vehicle 100*b* or the XR device 100*c* may generate the XR image based on the sensor information, and then the XR device 100*c* may output the generated XR image. The autonomous driving vehicle 100*b* may operate based on a control signal input through an external device such as the XR device 100*c* or user interaction.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the method and apparatus for transmitting and receiving an RLM-RS in an unlicensed band have been described above in the context of a 5G NewRAT system, they are also applicable to various wireless communication systems other than the 5G NewRAT system.

The invention claimed is:

1. A method for receiving a Channel State Information-reference signal (CSI-RS) by a user equipment (UE) in wireless communication system, the method comprising:
receiving information for receiving the CSI-RS in a plurality of frequency bands;
confirming whether each of the plurality of frequency bands is available; and
receiving, in the plurality of frequency bands, the CSI-RS based on all of the plurality of frequency bands being confirmed to be available,
wherein the CSI-RS is not received based on any frequency band, from the plurality of frequency bands, being confirmed to be not available, and
wherein, based on (i) the any frequency band being confirmed to be not available in a first time resource and (ii) the all of the plurality of frequency bands being confirmed to be available in a second time resource after the first time resource:
CSI-RS is received in the second time resource.

2. The method of claim 1, wherein a channel quality is measured based on the CSI-RS received in the second time resource.

3. The method of claim 1, wherein the confirming further comprising:
receiving information indicating whether each of the plurality of frequency bands is available; and
confirming whether each of the plurality of frequency bands is available based on the information indicating whether each of the plurality of frequency bands is available.

4. The method of claim 1, wherein whether the each of the plurality of frequency bands are available is determined based on Listen-Before-Talk (LBT) operation performed to each of the plurality of frequency bands.

5. A user equipment (UE) for receiving a Channel State Information-reference signal (CSI-RS) in wireless communication system, the UE comprising:
at least one transceiver;
at least one processor; and
at least one computer memory operably connectable to the at least one processor and storing instructions that, when executed by the at least one processor, perform operations comprising:
receiving, through the at least one transceiver, information for receiving the CSI-RS in a plurality of frequency bands;
confirming whether each of the plurality of frequency bands is available; and
receiving, through the at least one transceiver in the plurality of frequency bands, the CSI-RS based on all of the plurality of frequency bands being confirmed to be available,
wherein the CSI-RS is not received based on any frequency band, from the plurality of frequency bands, being confirmed to be not available, and
wherein, based on (i) the any frequency band being confirmed to be not available in a first time resource and (ii) the all of the plurality of frequency bands being confirmed to be available in a second time resource after the first time resource:
CSI-RS is received in the second time resource.

6. The UE of claim 5, wherein a channel quality is measured based on the CSI-RS received in the second time resource.

7. The UE of claim 5, wherein the confirming further comprising:
receiving information indicating whether each of the plurality of frequency bands is available; and
confirming whether each of the plurality of frequency bands is available based on the information indicating whether each of the plurality of frequency bands is available.

8. The UE of claim 5, wherein whether the each of the plurality of frequency bands are available is determined based on Listen-Before-Talk (LBT) operation performed to each of the plurality of frequency bands.

9. An apparatus for receiving a Channel State Information-reference signal (CSI-RS) in wireless communication system, the apparatus comprising:
at least one processor; and
at least one computer memory operably connectable to the at least one processor and storing instructions that, when executed by the at least one processor, perform operations comprising:
receiving information for receiving the CSI-RS in a plurality of frequency bands;
confirming whether each of the plurality of frequency bands is available; and
receiving, in the plurality of frequency bands, the CSI-RS based on all of the plurality of frequency bands being confirmed to be available, wherein the CSI-RS is not received based on any frequency band, from the plurality of frequency bands, being confirmed to be not available, and wherein, based on (i) the any frequency band being confirmed to be not available in a first time resource and (ii) the all of the plurality of frequency bands being confirmed to be available in a second time resource after the first time resource:

CSI-RS is received in the second time resource.

\* \* \* \* \*